US010046243B2

(12) United States Patent
Arnone et al.

(10) Patent No.: US 10,046,243 B2
(45) Date of Patent: Aug. 14, 2018

(54) FANTASY SPORTS WAGERING SYSTEM

(71) Applicant: Gamblit Gaming, LLC, Glendale, CA (US)

(72) Inventors: Miles Arnone, Sherborn, MA (US); Eric Meyerhofer, Pasadena, CA (US); Scott Shimmin, Vista, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

(21) Appl. No.: 14/708,162

(22) Filed: May 8, 2015

(65) Prior Publication Data

US 2015/0238873 A1 Aug. 27, 2015

Related U.S. Application Data

(63) Continuation of application No. PCT/US2013/067900, filed on Oct. 31, 2013.

(60) Provisional application No. 61/723,989, filed on Nov. 8, 2012.

(51) Int. Cl.
*A63F 13/828* (2014.01)
*G07F 17/32* (2006.01)

(52) U.S. Cl.
CPC ........ *A63F 13/828* (2014.09); *G07F 17/3223* (2013.01); *G07F 17/3288* (2013.01)

(58) Field of Classification Search
CPC .............................. G07F 17/32; G07F 17/3223
USPC .......................................................... 463/25
See application file for complete search history.

(56) References Cited

U.S. PATENT DOCUMENTS

| 5,413,357 | A |   | 5/1995  | Schulze et al. |
|-----------|---|---|---------|----------------|
| 5,683,090 | A | * | 11/1997 | Zeile ...................... A63F 3/0645 273/139 |
| 5,718,429 | A |   | 2/1998  | Keller |
| 5,785,592 | A |   | 7/1998  | Jacobsen |
| 5,853,324 | A |   | 12/1998 | Kami et al. |
| 5,963,745 | A |   | 10/1999 | Collins et al. |
| 6,050,895 | A |   | 4/2000  | Luciano |
| 6,165,071 | A |   | 12/2000 | Weiss |

(Continued)

OTHER PUBLICATIONS

U.S. Appl. No. 14/586,645 Arnone, et al. filed Dec. 30, 2014.

(Continued)

*Primary Examiner* — Omkar Deodhar
*Assistant Examiner* — Shauna-Kay Hall
(74) *Attorney, Agent, or Firm* — Caitlyn Ross

(57) ABSTRACT

Systems in accordance with embodiments of the invention provide separation between a computing device and a server that is constructed to execute a wager in accordance with a gambling proposition and contains the auditable systems and functions enabling gaming regulatory body approval. However, the wager is initiated by, and the result of the wager is to be communicated to, the computing device in an environment that is separate from the server and its auditable systems and functions. A controller is used to interface between the server and the computing device in its separate environment. The controller receives data from the computing device and uses that data to trigger wagers in the server. The controller receives wager outcomes from the server and converts those wager outcomes into instructions that are used to control the computing device, thus separating the computing device and the server.

5 Claims, 16 Drawing Sheets

(56) References Cited

U.S. PATENT DOCUMENTS

| | | |
|---|---|---|
| 6,227,974 B1 | 5/2001 | Eilat |
| 6,267,669 B1 | 7/2001 | Luciano |
| 6,685,563 B1 | 2/2004 | Meekins et al. |
| 6,712,693 B1 | 3/2004 | Hettinger |
| 6,761,632 B2 | 7/2004 | Bansemer et al. |
| 6,761,633 B2 | 7/2004 | Riendeau |
| 6,764,397 B1 | 7/2004 | Robb |
| 6,811,482 B2 | 11/2004 | Letovsky |
| 7,118,105 B2 | 10/2006 | Benevento |
| 7,294,058 B1 | 11/2007 | Slomiany |
| 7,326,115 B2 | 2/2008 | Baerlocher |
| 7,361,091 B2 | 4/2008 | Letovsky |
| 7,517,282 B1 | 4/2009 | Pryor |
| 7,575,517 B2 | 8/2009 | Parham et al. |
| 7,682,239 B2 | 3/2010 | Friedman et al. |
| 7,720,733 B2 | 5/2010 | Jung |
| 7,753,770 B2 | 7/2010 | Walker et al. |
| 7,753,790 B2 | 7/2010 | Nguyen |
| 7,766,742 B2 | 8/2010 | Bennett et al. |
| 7,775,885 B2 | 8/2010 | Van Luchene |
| 7,798,896 B2 | 9/2010 | Katz |
| 7,828,657 B2 | 11/2010 | Booth |
| 7,917,371 B2 | 3/2011 | Jung et al. |
| 7,938,727 B1 | 5/2011 | Konkle |
| 7,967,674 B2 | 6/2011 | Baerlocher |
| 7,980,948 B2 | 7/2011 | Rowe |
| 7,996,264 B2 | 8/2011 | Kusumoto et al. |
| 8,012,023 B2 | 9/2011 | Gates |
| 8,047,908 B2 | 11/2011 | Walker |
| 8,047,915 B2 | 11/2011 | Lyle |
| 8,060,829 B2 | 11/2011 | Jung et al. |
| 8,075,383 B2 | 12/2011 | Friedman et al. |
| 8,087,999 B2 | 1/2012 | Oberberger |
| 8,113,938 B2 | 2/2012 | Friedman et al. |
| 8,118,654 B1 | 2/2012 | Nicolas |
| 8,128,487 B2 | 3/2012 | Hamilton et al. |
| 8,135,648 B2 | 3/2012 | Oram |
| 8,137,193 B1 | 3/2012 | Kelly et al. |
| 8,142,272 B2 | 3/2012 | Walker |
| 8,157,653 B2 | 4/2012 | Buhr |
| 8,167,699 B2 | 5/2012 | Inamura |
| 8,177,628 B2 | 5/2012 | Manning |
| 8,182,338 B2 | 5/2012 | Thomas |
| 8,182,339 B2 | 5/2012 | Anderson |
| 8,187,068 B2 | 5/2012 | Slomiany |
| 8,206,210 B2 | 6/2012 | Walker |
| 8,308,544 B2 | 11/2012 | Friedman |
| 8,475,266 B2 | 7/2013 | Arnone |
| 8,480,470 B2 | 7/2013 | Napolitano et al. |
| 8,538,563 B1* | 9/2013 | Barber ............... G07F 17/3276 463/28 |
| 8,622,809 B1 | 1/2014 | Arora et al. |
| 2001/0004609 A1 | 6/2001 | Walker et al. |
| 2001/0019965 A1 | 9/2001 | Ochi |
| 2002/0022509 A1 | 2/2002 | Nicastro |
| 2002/0090990 A1 | 7/2002 | Joshi et al. |
| 2002/0175471 A1 | 11/2002 | Faith |
| 2003/0060286 A1 | 3/2003 | Walker et al. |
| 2003/0119576 A1 | 6/2003 | McClintic et al. |
| 2003/0139214 A1 | 7/2003 | Wolf et al. |
| 2003/0171149 A1 | 9/2003 | Rothschild |
| 2003/0204565 A1 | 10/2003 | Guo et al. |
| 2003/0211879 A1 | 11/2003 | Englman |
| 2004/0092313 A1 | 5/2004 | Saito et al. |
| 2004/0097610 A1 | 5/2004 | Saito |
| 2004/0102238 A1 | 5/2004 | Taylor |
| 2004/0121839 A1 | 6/2004 | Webb |
| 2004/0225387 A1 | 11/2004 | Smith |
| 2004/0266530 A1* | 12/2004 | Bishop ............... A63F 13/12 463/42 |
| 2005/0003878 A1 | 1/2005 | Updike |
| 2005/0096124 A1 | 5/2005 | Stronach |
| 2005/0116411 A1 | 6/2005 | Herrmann et al. |
| 2005/0192087 A1 | 9/2005 | Friedman et al. |
| 2005/0233791 A1 | 10/2005 | Kane |
| 2005/0233806 A1 | 10/2005 | Kane et al. |
| 2005/0239538 A1 | 10/2005 | Dixon |
| 2005/0261043 A1* | 11/2005 | Slade ............... G06Q 10/10 463/1 |
| 2005/0269778 A1 | 12/2005 | Samberg |
| 2005/0288101 A1 | 12/2005 | Lockton et al. |
| 2006/0003823 A1 | 1/2006 | Zhang |
| 2006/0003830 A1 | 1/2006 | Walker et al. |
| 2006/0035696 A1 | 2/2006 | Walker |
| 2006/0040735 A1 | 2/2006 | Baerlocher |
| 2006/0068913 A1 | 3/2006 | Walker et al. |
| 2006/0084499 A1 | 4/2006 | Moshal |
| 2006/0084505 A1 | 4/2006 | Yoseloff |
| 2006/0135250 A1 | 6/2006 | Rossides |
| 2006/0154710 A1 | 7/2006 | Serafat |
| 2006/0166729 A1 | 7/2006 | Saffari et al. |
| 2006/0189371 A1 | 8/2006 | Walker et al. |
| 2006/0223611 A1 | 10/2006 | Baerlocher |
| 2006/0234791 A1 | 10/2006 | Nguyen et al. |
| 2006/0240890 A1 | 10/2006 | Walker |
| 2006/0246403 A1 | 11/2006 | Monpouet et al. |
| 2006/0258433 A1 | 11/2006 | Finocchio et al. |
| 2007/0026924 A1 | 2/2007 | Taylor |
| 2007/0035548 A1 | 2/2007 | Jung et al. |
| 2007/0038559 A1 | 2/2007 | Jung et al. |
| 2007/0064074 A1 | 3/2007 | Silverbrook et al. |
| 2007/0087799 A1 | 4/2007 | Van Luchene |
| 2007/0093299 A1 | 4/2007 | Bergeron |
| 2007/0099696 A1 | 5/2007 | Nguyen et al. |
| 2007/0117641 A1 | 5/2007 | Walker et al. |
| 2007/0129149 A1 | 6/2007 | Walker |
| 2007/0142108 A1 | 6/2007 | Linard |
| 2007/0156509 A1 | 7/2007 | Jung et al. |
| 2007/0167212 A1 | 7/2007 | Nguyen |
| 2007/0167239 A1 | 7/2007 | O'Rourke |
| 2007/0173311 A1 | 7/2007 | Morrow et al. |
| 2007/0191104 A1 | 8/2007 | Van Luchene |
| 2007/0202941 A1 | 8/2007 | Miltenberger |
| 2007/0203828 A1 | 8/2007 | Jung et al. |
| 2007/0207847 A1 | 9/2007 | Thomas |
| 2007/0259717 A1 | 11/2007 | Mattice |
| 2007/0293306 A1 | 12/2007 | Nee et al. |
| 2008/0004107 A1 | 1/2008 | Nguyen et al. |
| 2008/0014835 A1 | 1/2008 | Weston et al. |
| 2008/0015004 A1 | 1/2008 | Gatto et al. |
| 2008/0064488 A1 | 3/2008 | Oh |
| 2008/0064490 A1* | 3/2008 | Ellis ............... H04N 5/44543 463/25 |
| 2008/0070659 A1 | 3/2008 | Naicker |
| 2008/0070690 A1 | 3/2008 | Van Luchene |
| 2008/0070702 A1 | 3/2008 | Kaminkow |
| 2008/0096665 A1 | 4/2008 | Cohen |
| 2008/0108406 A1 | 5/2008 | Oberberger |
| 2008/0108425 A1 | 5/2008 | Oberberger |
| 2008/0113704 A1 | 5/2008 | Jackson |
| 2008/0119283 A1 | 5/2008 | Baerlocher |
| 2008/0146308 A1 | 6/2008 | Okada |
| 2008/0161081 A1 | 7/2008 | Berman |
| 2008/0176619 A1 | 7/2008 | Kelly |
| 2008/0191418 A1 | 8/2008 | Lutnick et al. |
| 2008/0195481 A1 | 8/2008 | Lutnick |
| 2008/0248850 A1 | 10/2008 | Schugar |
| 2008/0254893 A1 | 10/2008 | Patel |
| 2008/0274796 A1 | 11/2008 | Lube |
| 2008/0274798 A1 | 11/2008 | Walker et al. |
| 2008/0311980 A1 | 12/2008 | Cannon |
| 2008/0318668 A1 | 12/2008 | Ching |
| 2009/0011827 A1 | 1/2009 | Englman |
| 2009/0023489 A1 | 1/2009 | Toneguzzo |
| 2009/0023492 A1 | 1/2009 | Erfanian |
| 2009/0061974 A1 | 3/2009 | Lutnick et al. |
| 2009/0061975 A1 | 3/2009 | Ditchev |
| 2009/0061991 A1 | 3/2009 | Popovich |
| 2009/0061997 A1 | 3/2009 | Popovich |
| 2009/0061998 A1 | 3/2009 | Popovich |
| 2009/0061999 A1 | 3/2009 | Popovich |
| 2009/0082093 A1 | 3/2009 | Okada |
| 2009/0088239 A1 | 4/2009 | Iddings |
| 2009/0098934 A1 | 4/2009 | Amour |

(56) References Cited

U.S. PATENT DOCUMENTS

| | | |
|---|---|---|
| 2009/0118006 A1 | 5/2009 | Kelly et al. |
| 2009/0124344 A1 | 5/2009 | Mitchell et al. |
| 2009/0131158 A1 | 5/2009 | Brunet De Courssou et al. |
| 2009/0131175 A1 | 5/2009 | Kelly et al. |
| 2009/0143141 A1 | 6/2009 | Wells |
| 2009/0149233 A1* | 6/2009 | Strause ................. G06Q 50/34 463/7 |
| 2009/0156297 A1 | 6/2009 | Andersson et al. |
| 2009/0176560 A1 | 7/2009 | Herrmann et al. |
| 2009/0176566 A1 | 7/2009 | Kelly |
| 2009/0181777 A1 | 7/2009 | Christiani |
| 2009/0221355 A1 | 9/2009 | Dunaevsky et al. |
| 2009/0239610 A1 | 9/2009 | Olive |
| 2009/0247272 A1 | 10/2009 | Abe |
| 2009/0270164 A1 | 10/2009 | Seelig |
| 2009/0291755 A1 | 11/2009 | Walker et al. |
| 2009/0309305 A1 | 12/2009 | May |
| 2009/0312093 A1 | 12/2009 | Walker et al. |
| 2009/0325686 A1 | 12/2009 | Davis |
| 2010/0004058 A1 | 1/2010 | Acres |
| 2010/0016056 A1 | 1/2010 | Thomas et al. |
| 2010/0029373 A1 | 2/2010 | Graham et al. |
| 2010/0035674 A1 | 2/2010 | Slomiany |
| 2010/0056247 A1 | 3/2010 | Nicely |
| 2010/0056260 A1 | 3/2010 | Fujimoto |
| 2010/0062836 A1 | 3/2010 | Young |
| 2010/0093420 A1 | 4/2010 | Wright |
| 2010/0093444 A1 | 4/2010 | Biggar et al. |
| 2010/0105454 A1 | 4/2010 | Weber |
| 2010/0120525 A1 | 5/2010 | Baerlocher et al. |
| 2010/0124983 A1 | 5/2010 | Gowin et al. |
| 2010/0137047 A1 | 6/2010 | Englman et al. |
| 2010/0137057 A1* | 6/2010 | Fleming ................. A63F 13/12 463/25 |
| 2010/0174593 A1 | 7/2010 | Cao |
| 2010/0184509 A1 | 7/2010 | Sylla et al. |
| 2010/0203940 A1 | 8/2010 | Alderucci et al. |
| 2010/0210344 A1 | 8/2010 | Edidin et al. |
| 2010/0227672 A1 | 9/2010 | Amour |
| 2010/0227688 A1 | 9/2010 | Lee |
| 2010/0240436 A1 | 9/2010 | Wilson et al. |
| 2010/0285857 A1* | 11/2010 | Anderson ............... G07F 17/32 463/9 |
| 2010/0304825 A1 | 12/2010 | Davis |
| 2010/0304839 A1 | 12/2010 | Johnson |
| 2010/0304842 A1 | 12/2010 | Friedman et al. |
| 2011/0009177 A1 | 1/2011 | Katz |
| 2011/0009178 A1 | 1/2011 | Gerson |
| 2011/0045896 A1 | 2/2011 | Sak et al. |
| 2011/0077087 A1 | 3/2011 | Walker et al. |
| 2011/0082571 A1 | 4/2011 | Murdock et al. |
| 2011/0105206 A1 | 5/2011 | Rowe et al. |
| 2011/0107239 A1 | 5/2011 | Adoni |
| 2011/0109454 A1 | 5/2011 | McSheffrey |
| 2011/0111820 A1 | 5/2011 | Filipour |
| 2011/0111837 A1 | 5/2011 | Gagner |
| 2011/0111841 A1 | 5/2011 | Tessmer |
| 2011/0118011 A1 | 5/2011 | Filipour et al. |
| 2011/0201413 A1 | 8/2011 | Oberberger |
| 2011/0207523 A1 | 8/2011 | Filipour et al. |
| 2011/0212766 A1 | 9/2011 | Bowers |
| 2011/0212767 A1 | 9/2011 | Barclay |
| 2011/0218028 A1 | 9/2011 | Acres |
| 2011/0218035 A1 | 9/2011 | Thomas |
| 2011/0230258 A1 | 9/2011 | Van Luchene |
| 2011/0230260 A1 | 9/2011 | Morrow et al. |
| 2011/0230267 A1 | 9/2011 | Van Luchene |
| 2011/0244944 A1 | 10/2011 | Baerlocher |
| 2011/0263312 A1 | 10/2011 | De Waal |
| 2011/0269522 A1 | 11/2011 | Nicely et al. |
| 2011/0275440 A1 | 11/2011 | Faktor |
| 2011/0281620 A1* | 11/2011 | Hays ................... G07F 17/3288 463/2 |
| 2011/0287828 A1 | 11/2011 | Anderson et al. |
| 2011/0287841 A1 | 11/2011 | Watanabe |
| 2011/0312408 A1 | 12/2011 | Okuaki |
| 2011/0319169 A1 | 12/2011 | Lam |
| 2012/0004747 A1 | 1/2012 | Kelly |
| 2012/0009984 A1* | 1/2012 | Amaitis ............... G07F 17/3237 463/4 |
| 2012/0028718 A1 | 2/2012 | Barclay et al. |
| 2012/0058814 A1 | 3/2012 | Lutnick |
| 2012/0077569 A1 | 3/2012 | Watkins |
| 2012/0108323 A1 | 5/2012 | Kelly |
| 2012/0135793 A1 | 5/2012 | Antonopoulos |
| 2012/0202587 A1 | 8/2012 | Allen |
| 2012/0231890 A1 | 9/2012 | Junkin et al. |
| 2012/0264503 A1 | 10/2012 | Lisenbee |
| 2012/0302311 A1 | 11/2012 | Luciano |
| 2012/0322545 A1 | 12/2012 | Arnone et al. |
| 2013/0029760 A1 | 1/2013 | Wickett |
| 2013/0131848 A1 | 5/2013 | Arnone et al. |
| 2013/0190074 A1 | 7/2013 | Arnone et al. |
| 2013/0260869 A1 | 10/2013 | Leandro et al. |
| 2014/0087801 A1 | 3/2014 | Nicely et al. |
| 2014/0087808 A1 | 3/2014 | Leandro et al. |
| 2014/0087809 A1 | 3/2014 | Leupp et al. |

OTHER PUBLICATIONS

U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/185,847 Arnone, et al., filed Feb. 20, 2014.
U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.

(56) References Cited

OTHER PUBLICATIONS

U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.
U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.

* cited by examiner

FANTASY SPORTS WAGERING SYSTEM

CROSS-REFERENCE TO RELATED APPLICATIONS

This application is a continuation of Patent Cooperation Treaty Application No. PCT/US13/67900, filed Oct. 31, 2013 which claims the benefit of U.S. Provisional Application No. 61/723,989, filed Nov. 8, 2012, the disclosure of which is incorporated herein by reference as if set forth herewith.

FIELD OF THE INVENTION

Embodiments of the present invention are generally related to gaming and more specifically to systems and processes that provide a gambling hybrid game in which a fantasy sports game is provided as an entertainment game and gambling events are triggered by game events during play of the fantasy sports game.

BACKGROUND

The gaming machine manufacturing industry provides a variety of gaming machines to enable wagering for interested parties whilst providing an entertainment experience. An exemplary gaming machine is a slot machine. As the demographic of eligible players has shifted with time to newer generations who have grown accustomed to highly sophisticated graphics and interactive video games, a need has arisen to increase the entertainment content present on a gaming machine to keep it relevant, at least to a growing portion of a casino's patronage. The subject design is a form of gaming machine, designed for use in a physical or virtual casino environment, which provides players an environment in which to play for cash, prizes and points, either against the casino or in head to head modes in a controlled and regulated manner while being allowed to use their skills and adeptness at a particular type of game. An example of such a game would be a challenging word spelling game, or an interactive action game such as is found on video game consoles popular today, such as a PlayStation®, an Xbox®, a Wii® or a PC based.

SUMMARY OF THE INVENTION

Systems in accordance with embodiments of the invention provide separation between a computing device and a server that is constructed to execute a wager in accordance with a gambling proposition and contains the auditable systems and functions enabling gaming regulatory body approval. However, the wager is initiated by, and the result of the wager is to be communicated to, the computing device in an environment that is separate from the server and its auditable systems and functions. A controller is used to interface between the server and the computing device in its separate environment. The controller receives data from the computing device and uses that data to trigger wagers in the server. The controller receives wager outcomes from the server and converts those wager outcomes into instructions that are used to control the computing device.

In an embodiment, a network distributed computing system comprises: a computing device connected to a controller by a network, wherein the computing device is configured to execute an entertainment game and present an entertainment game to a player wherein the entertainment game is a fantasy sports game, and wherein the computing device is further configured to: maintain a team roster of participants in a sport for the player; receive data pertaining to sporting events in the sport; and compile a score for the team based on the roster of participants on the team and the data pertaining to the sporting events. A server is connected to the controller by a communication link, and the server is constructed to determine a result of the gambling event and to resolve a wager on a proposition about the result of the gambling event. The controller is connected to the computing device by the network and connected to the server by the communication link, wherein the controller is constructed to: determine when a gambling event occurs during play of the entertainment game and request a resolution to the gambling event by the server, wherein the controller is further constructed to: receive a status update about the sporting events of fantasy sports game from the entertainment engine, determine a gambling event is to occur based upon the status update from the entertainment engine, and request the gambling event be resolved by the real world engine.

In further embodiments, the computing device is further constructed to provide a draft for a league in of the fantasy sport game and the controller is constructed to: request a resolution of a gambling event by the server; receive the result of the gambling event from the server; and determine an order of selections in the draft based on the result of the gambling event.

In yet further embodiments, the controller is constructed to: request a resolution of a gambling event by the server for each round of the draft; receive the result of the gambling event for each round of the draft from the server; and determine an order of selections in each round based on the result of the gambling event for each round of the draft.

In additional embodiments, the controller is further is constructed to: receive the result of the gambling event from the server; and determine an amount of game world currency to provide to the player based on the result of gambling event.

In some embodiments, the computing device is constructed to allow a player to make an adjustment to a roster of the team of the player for a certain amount of game world currency.

In various embodiments, the controller and the server are constructed from a same processing apparatus.

In some embodiments, the controller and the server are constructed from different processing apparatuses, and wherein the communication link utilizes a network.

DETAILED DISCLOSURE OF THE INVENTION

Turning now to the drawings, systems and methods for providing a fantasy sports game as an entertainment game of a gambling hybrid game in accordance with some embodiments of the invention are illustrated. In accordance with many embodiments of the invention, a gambling hybrid game (HyG) provides a fantasy sports league as an entertainment game that allows players the opportunity to participate in fantasy league play, with the addition of a real world based gambling element. While the outcome of the gambling element may be based solely on the outcome of an RNG based gaming module. In accordance with many of these embodiments, the gambling hybrid game offers an enriched gaming experience, based on fantasy sports league play which through the game world engine (GWE) of the gambling hybrid game triggers real world gambling events via the real world engine (RWE).

Hybrid Gaming Systems

Figure 1:
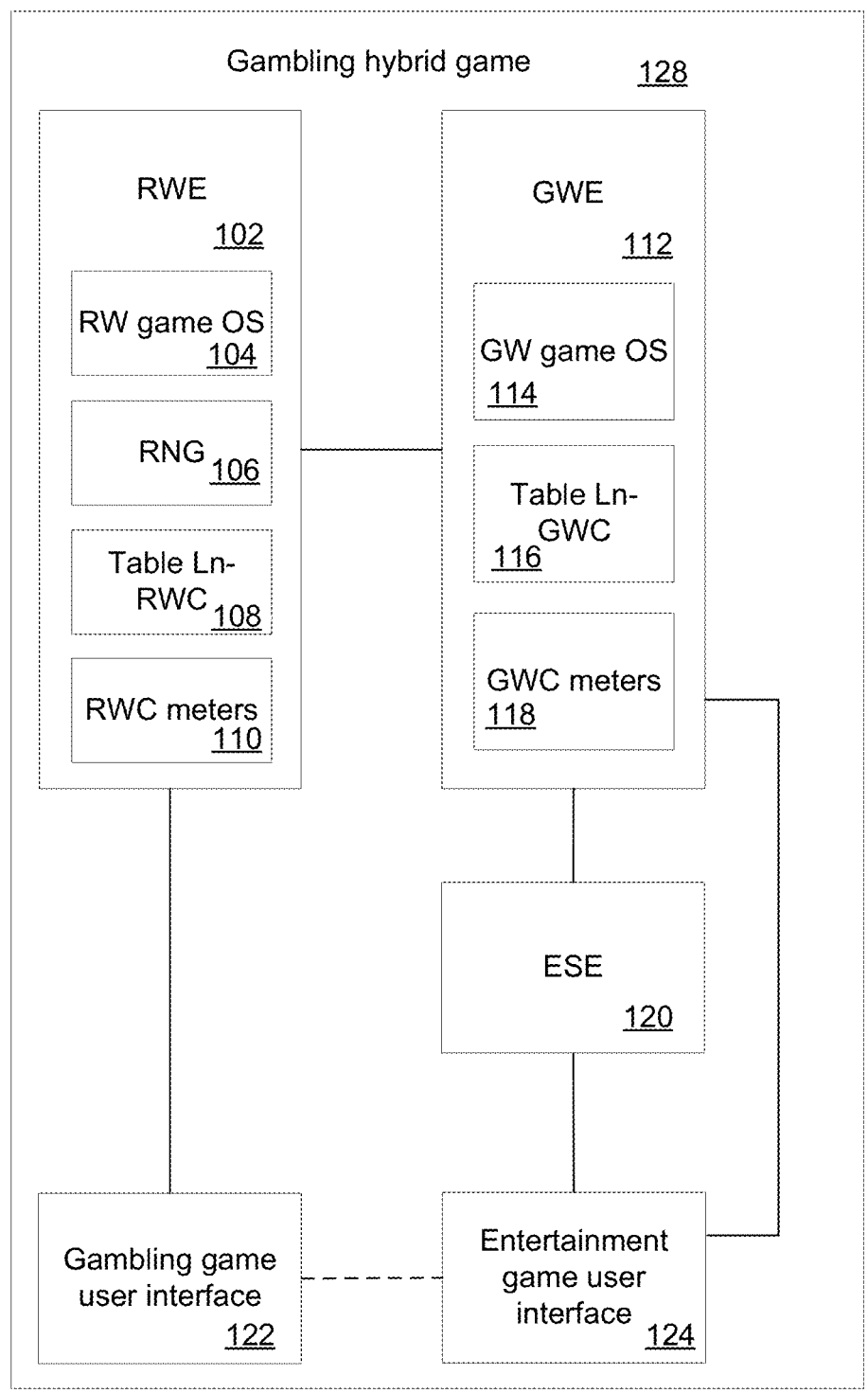
FIG. 1 illustrates a conceptual diagram of components of a gambling hybrid game in accordance with an embodiment of the invention.

In accordance with many embodiments of the invention, a gambling hybrid game integrates high-levels of entertainment content with a game of skill (entertainment game) and a gambling experience with a game of chance (gambling game). A gambling hybrid game provides for random outcomes independent of player skill while providing that the user's gaming experience (as measured by obstacles/challenges encountered, time of play and other factors) is shaped by the player's skill. The outcome of a gambling proposition that is determined by a Random Number Generator (RNG) or other such device that provides a random outcome in response to a request. In accordance with some embodiments, the wager game may be initiated in response to a game object related player action. A gambling hybrid game in accordance with an embodiment of the invention is illustrated in FIG. 1. The gambling hybrid game 128 includes a Real World Engine (RWE) 102, a Game World Engine (GWE) 112, an Entertainment System Engine (ESE) 120, a gambling game user interface 122 and an entertainment game user interface 124. The two user interfaces can be part of the same user interface but are separate in the illustrated embodiment. The RWE 102 is connected with the GWE 112 and the gambling game user interface 122. The ESE 120 is connected with the GWE 112 and the entertainment game user interface 124. The GWE 112 is connected also with the entertainment game user interface 124.

In accordance with several embodiments, the RWE 102 is the operating system for the gambling game of the gambling hybrid game 128 and controls and operates the gambling game. The operation of a gambling game is enabled by Real World Currency (RC), such as money or other real world funds. A gambling game can increase or decrease an amount of RC based on random gambling outcomes, where the gambling proposition of a gambling game is typically regulated by gaming control bodies. In many embodiments, the RWE includes a Real World (RW) operating system (OS) 104, RNG 106, level n real-world credit pay tables (table Ln-RC) 108, RC meters 110 and other software constructs that enable a game of chance to offer a fair and transparent gambling proposition, and to contain the auditable systems and functions that can enable the game to obtain gaming regulatory body approval.

A random number generator (RNG) 106 includes software and/or hardware algorithms and/or processes, which are used to generate random outcomes. A level n real-world credit pay table (table Ln-RC) 108 is a table that can be used in conjunction with a random number generator (RNG) 106 to dictate the RC earned as a function of sponsored gameplay and is analogous to the pay tables used in a conventional slot machine. Table Ln-RC payouts are independent of player skill. There can be one table or multiple tables included in Ln-RC pay tables 108 contained in a gambling game, the selection of which can be determined by factors including (but not limited to) game progress that a player has earned, and/or bonus rounds for which a player can be eligible. RCs are credits analogous to slot machine game credits, which are entered into a gambling game by the user, either in the form of money such as hard currency or electronic funds. RCs can be decremented or augmented based on the outcome of a random number generator according to the table Ln-RC real world credits pay table 108, independent of player skill. In certain embodiments, an amount of RC can be used as criteria in order to enter higher ESE game levels. RC can be carried forward to higher game levels or paid out if a cash out is opted for by a player. The amount of RC used to enter a specific level of the game level n need not be the same for each level.

In accordance with some embodiments of the invention, the GWE 112 manages the overall gambling hybrid game operation, with the RWE 102 and the ESE 120 effectively being support units to the GWE 112. In accordance with some of these embodiments, the GWE 112 contains mechanical, electronic, and software systems for an entertainment game. The GWE 112 includes an operating system (OS) 114 that provides control of the entertainment game.

The GWE additionally contains a level n game world credit pay table (table Ln-GWC) 116 from where to take input from this table to affect the play of the entertainment game. The GWE 112 can further couple to the RWE 102 to determine the amount of RC available on the game and other metrics of wagering on the gambling game (and potentially affect the amount of RC in play on the RWE). The GWE additionally contains various audit logs and activity meters (such as the GWC meter) 118. The GWE 112 can also couple to a centralized server for exchanging various data related to the player and their activities on the game. The GWE 112 furthermore couples to the ESE 120.

In accordance with some embodiments, a level n game world credit pay table (Table Ln-GWC) 116 dictates the Game World Credit (GWC) earned as a function of player skill in the nth level of the game. The payouts governed by this table are dependent upon player skill and sponsored gameplay at large and can or cannot be coupled to a RNG. In accordance with some embodiments, GWCs are player points earned or depleted as a function of player skill, specifically as a function of player performance in the context of the game. GWC is analogous to the score in a typical video game. Each entertainment game has one or more scoring criterion, embedded within the table Ln-GWC 116 that reflects player performance against the goal(s) of the game. GWCs can be carried forward from one level of sponsored gameplay to another, and ultimately paid out in various manners such as directly in cash, or indirectly such as by earning entrance into a sweepstakes drawing, or earning participation in, or victory in, a tournament with prizes. GWCs can be stored on a player tracking card or in a network-based player tracking system, where the GWCs are attributed to a specific player.

In accordance with certain embodiments, the operation of the GWE does not affect the RWE's gambling operation except for player choice parameters that are allowable in slot machines, including but not limited to, wager terms such as, but not limited to, a wager amount, how fast the player wants to play (by pressing a button or pulling the handle of a slot machine), and/or agreement to wager into a bonus round. In this sense, the RWE 102 provides a fair and transparent, non-skill based gambling proposition co-processor to the GWE 112. In the illustrated embodiment, the communication link shown between the GWE 112 and the RWE 102 allows the GWE 112 to obtain information from the RWE 102 as to the amount of RC available in the gambling game. The communication link can also convey a status operation of the RWE (such as on-line or tilt). The communication link can further communicate the various gambling control factors which the RWE 102 uses as input, such as the number of RC consumed per game or the player's election to enter a jackpot round. In FIG. 1, the GWE 112 is also shown as connecting to the player's user interface directly, as this can be utilized to communicate certain entertainment game club points, player status, control the selection of choices and messages which a player can find useful in order to adjust the entertainment game experience or understand their gambling status in the RWE 102.

In accordance with various embodiments of the invention, the ESE 120 manages and controls the visual, audio, and player control for the entertainment game. In accordance with certain embodiments, the ESE 120 accepts input from a player through a set of hand controls, and/or head, gesture, and/or eye tracking systems and outputs video, audio and/or other sensory output to a user interface. In accordance with many embodiments, the ESE 120 can exchange data with and accept control information from the GWE 112. In accordance with some of these embodiments, an ESE 120 can be implemented using a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In accordance with some of these embodiments, ESE 120 can be an electromechanical game system of a draw certificate based gambling hybrid game that is an electromechanical hybrid game. An electromechanical hybrid game executes an electromechanical game for player entertainment. The electromechanical game can be any game that utilizes both mechanical and electrical components, where the game operates as a combination of mechanical motions performed by at least one player or the electromechanical game itself. Various electromechanical hybrid games are discussed in Patent Cooperation Treaty Application No. PCT/US12/58156, filed Sep. 29, 2012, the contents of which are hereby incorporated by reference in their entirety.

The ESE 120 operates mostly independently from the GWE 112, except that via the interface, the GWE 112 can send certain entertainment game control parameters and elements to the ESE 120 to affect its play, such as (but not limited to) what level of character to be using, changing the difficulty level of the game, changing the type of gun or car in use, and/or requesting portions to become available or to be found by the character. These game control parameters and elements can be based on a gambling outcome of a gambling game that was triggered by an element in the entertainment game being acted upon by the player. The ESE 120 can accept this input from the GWE 112, make adjustments, and continue entertainment game gameplay all the while running seamlessly from the player's perspective. The ESE's operation is mostly skill based, except for where the ESE's processes can inject complexities into the game by chance in its normal operation to create unpredictability in the entertainment game. Utilizing this interface, the ESE 120 can also communicate player choices made in the game to the GWE 112, such as but not limited to selection of a different gun, and/or the player picking up a special portion in the GW environment. The GWE's function in this architecture, being interfaced with the ESE 120, is to allow the transparent coupling of entertainment software to a fair and transparent random chance gambling game, providing a seamless perspective to the player that they are playing a typical popular entertainment game (which is skill based). In accordance with certain embodiments, the ESE 120 can be used to enable a wide range of entertainment games including but not limited to popular titles from arcade and home video games, such as but not limited to Gears of War (a third person shooter game developed by Epic Games of Cary, N.C.), Time Crisis (a shooter arcade game developed by Namco Ltd of Tokyo, Japan), or Madden Football (an American football video game developed by EA Tiburon of Maitland, Fla.). Providers of such software can provide the previously described interface by which the GWE 120 can request amendments to the operation of the ESE software in order to provide seamless and sensible operation as both a gambling game and an entertainment game.

In accordance with some embodiments, the RWE 102 can accept a trigger to run a gambling game in response to actions taken by the player in the entertainment game as conveyed by the ESE 120 to the GWE 112, or as triggered by the GWE 112 based on its algorithms, background to the overall game from the player's perspective, but can provide information to the GWE 112 to expose the player to certain aspects of the gambling game, such as (but not limited to) odds, amount of RC in play, and amount of RC available. The RWE 102 can accept modifications in the amount of RC wagered on each individual gambling try, or the number of gambling games per minute the RWE 102 can execute, entrance into a bonus round, and other factors, all the while these factors can take a different form than that of a typical slot machine. An example of a varying wager amount that the player can choose can include, but is not limited to, gameplay with a more powerful character, a more powerful gun, or a better car. These choices can increase or decrease the amount wagered per individual gambling game, in the same manner that a standard slot machine player can decide to wager more or less credits for each pull of the handle. In accordance with some of these embodiments, the RWE 102 can communicate a number of factors back and forth to the GWE 112, via an interface, such increase/decrease in wager being a function of the player's decision making as to their operational profile in the entertainment game (such as but not limited to the power of the character, gun selection or car choice). In this manner, the player is always in control of the per game wager amount, with the choice mapping to some parameter or component that is applicable to the entertainment game experience of the hybrid game. In accordance with a particular embodiment, the RWE 102 operation can be a game of chance as a gambling game running every 10 seconds where the amount wagered is communicated from the GWE 112 as a function of choices the player makes in the operation profile in the entertainment game.

In many embodiments, a gambling hybrid game integrates a video game style gambling machine, where the gambling game (including an RWE 102 and RC) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time, a rich environment of rewards to stimulate gamers can be established with the entertainment game. In accordance with some of these embodiments, the gambling hybrid game can leverage very popular titles with gamers and provides a sea change environment for casinos to attract players with games that are more akin to the type of entertainment that a younger generation desires. In accordance with various embodiments, players can use their skill towards building and banking GWC that in turn can be used to win tournaments and various prizes as a function of their gamer prowess. Numerous embodiments minimize the underlying changes needed to the aforementioned entertainment software for the hybrid game to operate within an entertainment game construct, thus making a plethora of complex game titles and environments, rapid and inexpensive to deploy in a gambling environment.

In accordance with some embodiments, gambling hybrid games also allow players to gain entry into subsequent competitions through the accumulation of game world credits (GWC) as a function of the user's demonstrated skill at the game. These competitions can pit individual players or groups of players against one another and/or against the casino to win prizes based upon a combination of chance and skill. These competitions can be either asynchronous events, whereby players participate at a time and/or place of their choosing, or they can be synchronized events, whereby players participate at a specific time and/or venue.

In accordance with some embodiments, one or more players engage in playing an entertainment game, resident in the ESE, the outcomes of which are dependent at least in part on skill. The gambling hybrid game can include an entertainment game that includes head to head play between a single player and the computer, between two or more players against one another, or multiple players playing against the computer and/or each other, as well as the process by which players bet on the outcome of the entertainment game. The entertainment game can also be a game where the player is not playing against the computer or any other player, such as in games where the player is effectively playing against himself or herself (such as but not limited to Solitaire and Babette).

Figure 2:
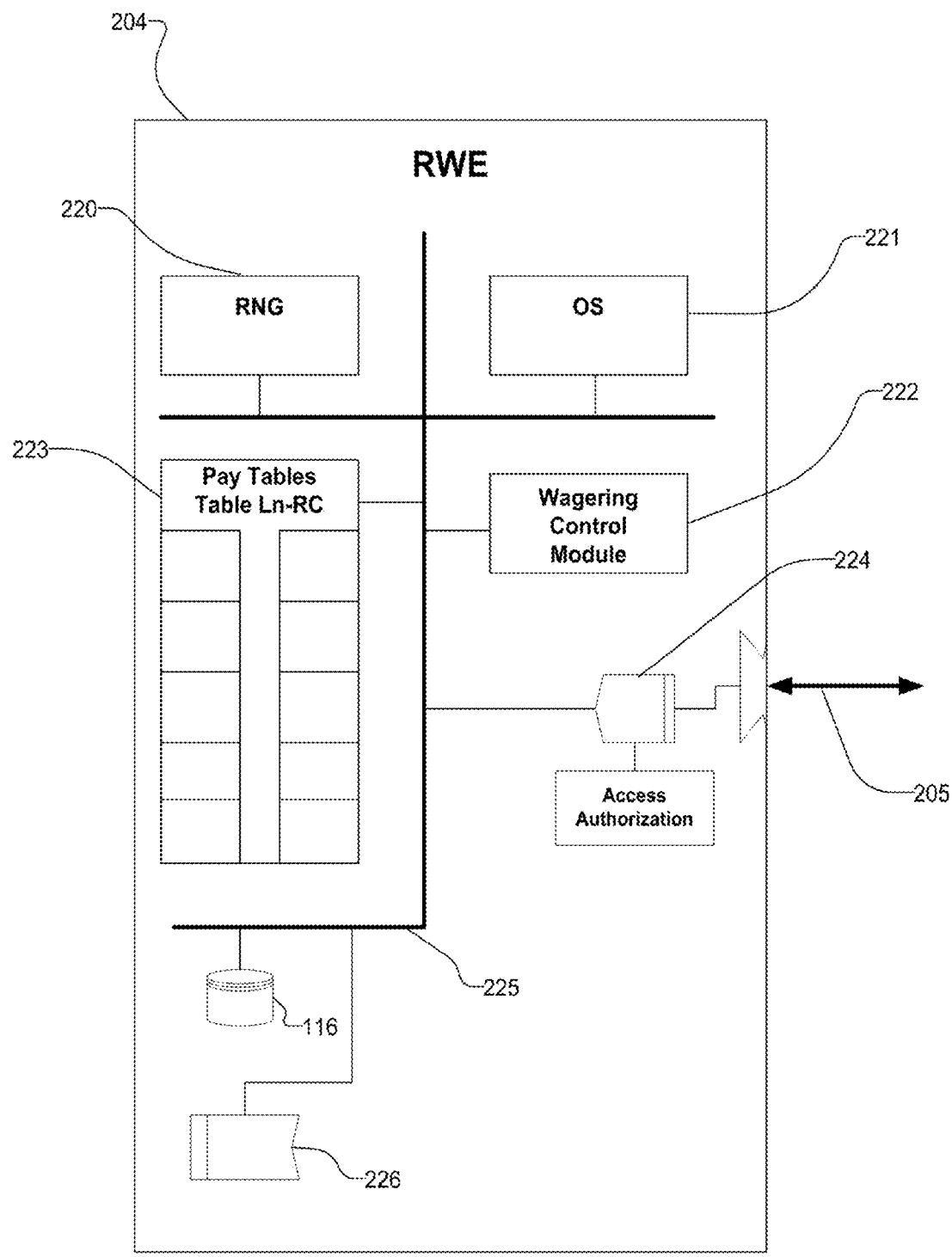
FIG. 2 illustrates a conceptual diagram of aspects of a Real World Engine (RWE) of a gambling hybrid game in accordance with some embodiments of the invention.

The components provided by the RWE for a gambling hybrid game in accordance with embodiments of the invention are shown in FIG. 2. In accordance with embodiments of the invention, the RWE includes an internal bus 225 that connects an operating system OS 221, a Random Number Generator ("RNG") 220, one or more pay tables (Table Ln-RC) 223 which would control the functions of the RWE, a Random Number Generator ("RNG") 220 to produce random numbers, one or more pay tables (Table Ln-RC) 223, a wagering control module 222, an authorization access module 224, and a RC credit meter 226 that are included in the RWE 204. The RW OS 221 controls the functions of the RWE. The RNG 220 includes one or more RNGs that are used to produce random numbers for use in resolving gambling events and other process requiring a random number to determine an outcome. The one or more pay tables (Table Ln-RC) 223 contain a plurality of factors indexed by the random number to be multiplied with the RC wagered to determine the payout on a successful wager. A wagering control module 222 performs the processes to resolve a wager on a proposition of a gambling event. The resolution process includes, but is not limited to, pulling random numbers, looking up factors in Pay Tables, multiplying the factors by the amount of RC wagered, and administering a RC credit meter 226. A repository (a credit meter) 926 maintains a record of the amount of RC which player has deposited in the game and has been accumulated by the player.

An external connection allows the RWE 204 to interface to another system or device, which is shown in FIG. 2 as the internet 205 but may be any other network and/or device. The authorization access module 224 of RWE 204 is connected to the external connection and provides a method to permit access and command exchange between an external system and the RWE 904. The RWE 904 also contains storage for statuses, wagers, wager outcomes, meters and other historical events in a storage device 116.

Figure 3:
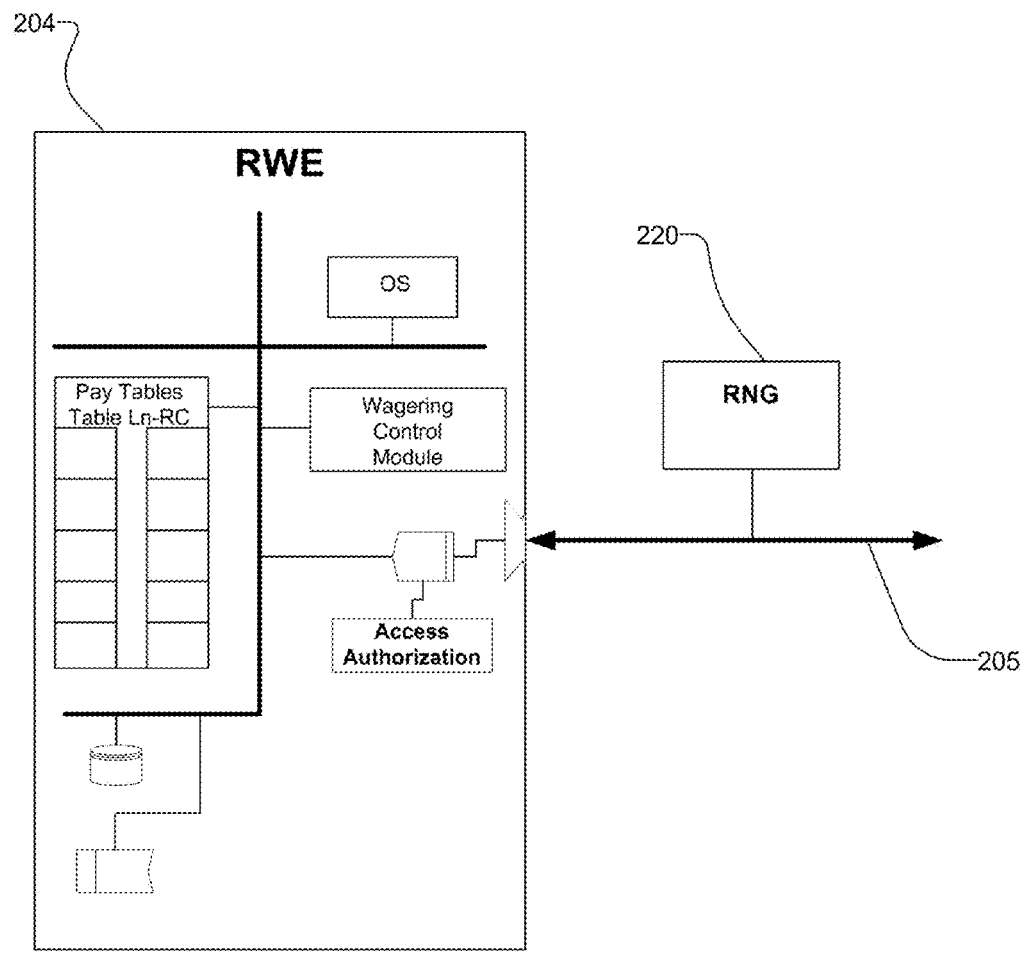
FIG. 3 illustrates a conceptual diagram of aspects of a Real World Engine of a gambling hybrid game in accordance with some other embodiments of the invention.

In some embodiments, the RWE communicates with external systems to provide various functions of a gambling hybrid game in accordance with embodiments of the invention. The components of an RWE that communicate with an external system to provide a component of the RWE in accordance with embodiments of the invention are shown in FIG. 3. The RWE 204 shown in FIG. 3 is similar to the RWE shown in FIG. 2. However, the RNG 220 which is an external system connected to the RWE 204 by the internet 905 in accordance with embodiments of the invention. The RNG 220 could be a central deterministic system, such as a regulated and controlled random numbered ball selection device, or some other system which provides random or pseudo random numbers to one or a plurality of connected RWEs 204. One skilled in the art will recognize that only RNG 220 is an external system in the shown embodiments.

However, any of the components could be external systems without departing from the invention and RNG 220 is shown as an example only.

In FIGS. 2 and 3, the RWE 204 interfaces with other systems/devices or to an external RNG 220 using the Internet 205. However, one skilled in the art will note that nothing would preclude using a different interface than the internet 205 in other embodiments of the invention. Other examples of interfaces include, but are not limited to, a LAN, a USB interface, or some other method by which two electronic and software constructs could communicate with each other.

Figure 4:
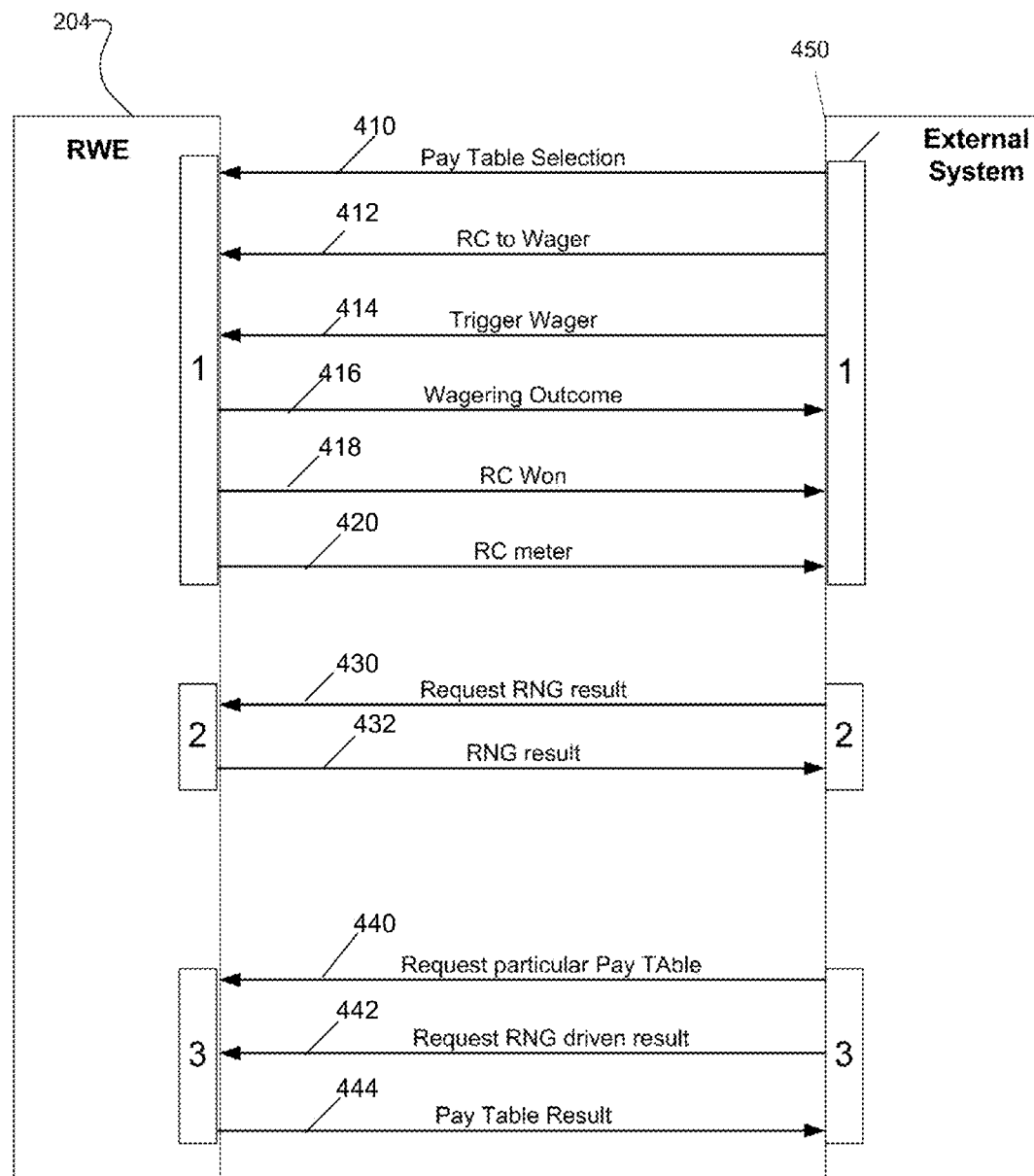
FIG. 4 illustrates a signaling diagram of communications between a Real World Engine (RWE) and an external system to provide various functions in accordance with embodiments of the invention.

The RWE and an external system typically communicate to provide the resolution of gambling events to resolve wagers on the events. The signals between the RWE and an external system to provide some process related to resolving gambling events in accordance with embodiments of the invention are shown in FIG. 4. In accordance with embodiments of the invention, the primary function of the RWE 204 is to manage wagering events and to provide random (or pseudo random) numbers from an RNG. At the top of the figure, a 6 component communication exchange grouped by the "1" box is shown for a wager on a proposition in a gambling event during a gambling hybrid game in accordance with embodiments of the invention. An external system 450 that is requesting wagering support from the RWE 204 instructs the RWE 204 as to the pay table (Table Ln-RC) to use (410), followed by the amount of RC to wager on the proposition of the gambling event (412). Next, the external system 450 signals the RWE to trigger a wager or perform the gambling event (414). The RWE 204 resolves the gambling event. The RWE 204 then informs external system 450 as to the outcome of the wager (416), the amount of RC won (418), and the amount of RC in the player's account (in the credit repository) (420).

A second communication exchange between the RWE 204 and an external system 450 in accordance with embodiments of the invention that is shown in FIG. 4 is grouped by the "2" box in FIG. 4 and relates to the external system 450 needing an RNG result support from the RWE 204. In this exchange, the external system 450 requests an RNG result from the RWE 204 (430). The RWE 204 returns an RNG result to the external 450 in response to the request (432). The result may be generated as a function of the internal RNG in the RWE 204, or from an RNG external to the RWE 204 to which the RWE 204 is connected.

A third communication exchange between the RWE 204 and the external system 405 in accordance with embodiments of the invention that is shown in FIG. 4 is grouped by the "3" box in the figure and relates to the external system 450 wanting support on coupling an RNG result to a particular Pay Table contained in the RWE 204. In this exchange, the external system 450 instructs the RWE as to the pay table (Table Ln-RC) to use 450. The external system then requests a result whereby the RNG result is coupled to the requested Pay Table (442). The result is returned to the external system 405 by RWE 204 (444). Such an aspect is different from the first exchange shown by the box"1" sequence in that no actual RC wager is conducted. However, such a process t might be useful in coupling certain non-RC wagering entertainment game behaviors and propositions to the same final resultant wagering return which is understood for the gambling hybrid game to conduct wagering.

In regards to FIG. 4, one skilled in the art will note that the thrust of the FIG. 4 is to convey overall functional exchanges between an RWE 204 and an external system 450. As such, various protocol layers necessary for error free and secure communication, and other status, setup, and configuration commands which one might expect in any protocol between two connected systems have been omitted for clarity. Furthermore, some or all of the various commands and responses illustrated could be combined into one or more communication packets without departing from the invention.

Figure 5:
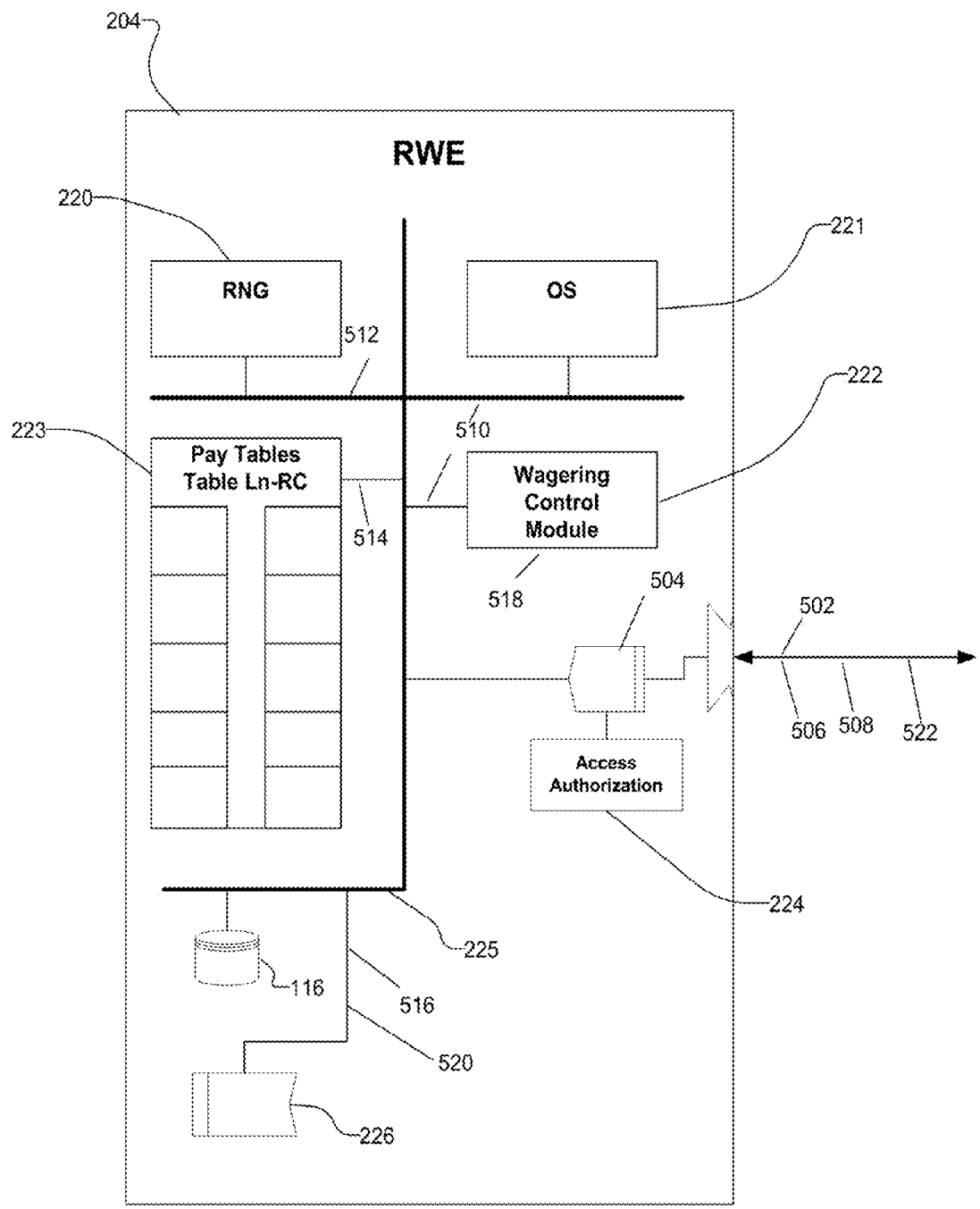
FIG. 5 illustrates a conceptual diagram of a process flow and signaling in a RWE to provide various functions in accordance with embodiments of the invention.

The process flow for functional communication exchanges, such as communication exchanges described above with reference to FIG. 4, between a RWE and an external system in accordance with embodiments of the invention are shown in FIG. 5. The process begins by a RWE 204 receiving signals from an external system requesting a connection to RWE 204. The Access Authorization Module determines that the external system authorized to connect to RWE 204 (504) and transmits an authorization response to the external system. The external systems that provide requests a request for a gambling event is to be performed to RWE 294 (506). The request may include an indication of a wager amount on a proposition in the gambling event, and a proper pay table to use to resolve the wager. The external system then sends a signal to trigger the gambling event (508).

The OS 221 instructs the Wager Control Module 222 as to the RC wager and the Pay Table to select as well as to resolve the wager execute (510). In response to the request to execute the gambling event, the wager control module 222 requests an RNG result from the RNG 220 (512); retrieves a proper pay table or tables from the pay tables 223 (514); adjusts the RC of the player in the RC repository 926 as instructed (516; applies the RNG result to the particular pay table or tables (518); and multiplies the resultant factor from the Pay Table by the amount of RC to determine the result of the wager (518). Wager Control Module 222 then adds the amount of RC won by the wager to the RC repository 426 (520); and provides the outcome of the wager, and the amount of RC in the RWE and the RC won (522). One skilled in the art will recognize that there may be many embodiments of an RWE 204 which could be possible, including forms where many modules and components of the RWE are located in various servers and locations, so the foregoing is not meant to be exhaustive or all inclusive, but rather provide information about an RWE 204 in accordance with some embodiments of the invention.

Figure 6:
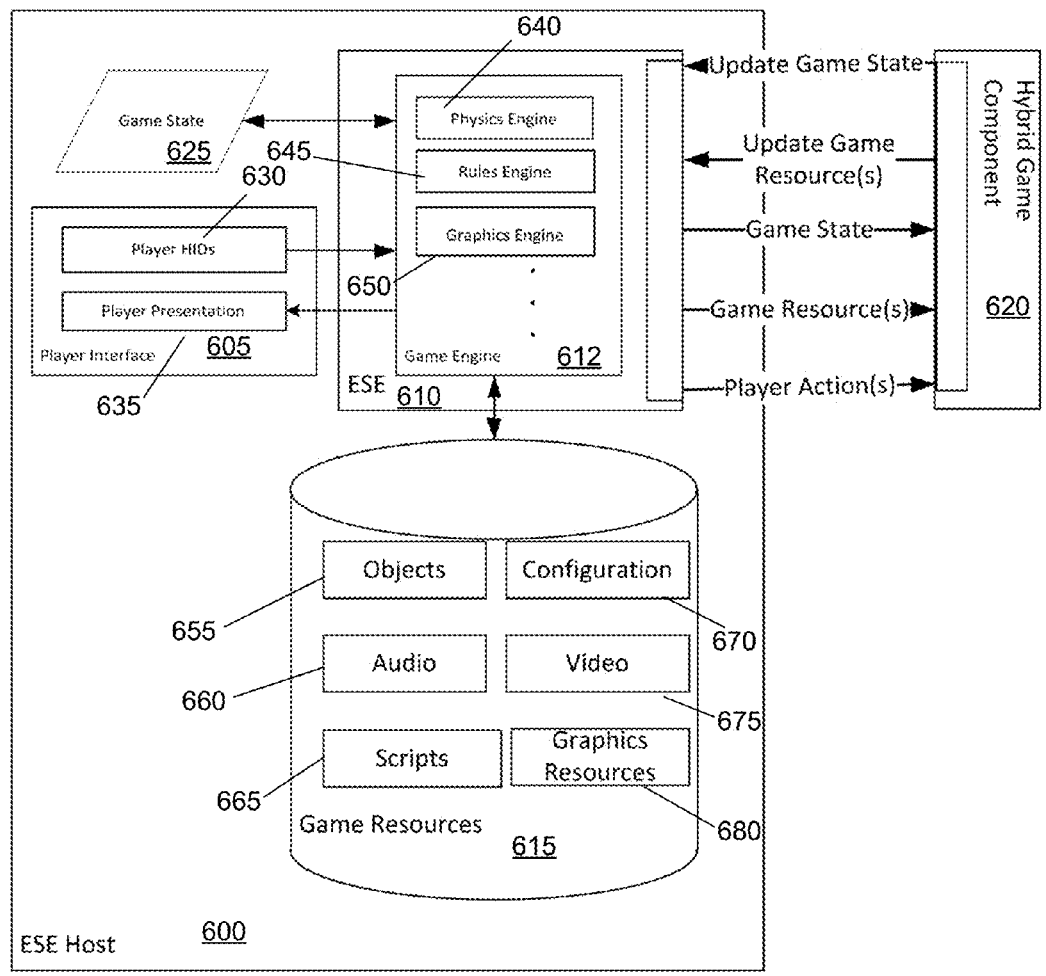
FIG. 6 illustrates a conceptual diagram of aspects of an Entertainment System Engine in accordance with embodiments of the invention.

A block diagram of components an ESE being provided by an ESE host for a gambling hybrid game in accordance with embodiments of the invention are shown in FIG. 6. An ESE 610 may be part of the entertainment game itself, may be a software module that is executed by the entertainment game, or may provide an execution environment for the entertainment game for a particular host. The ESE 610 and associated entertainment game are hosted by an ESE host 600. The ESE host 600 is a computing device that is capable of hosting the ESE 610 and the entertainment game. Exemplary hosts include video game consoles, smart phones, personal computers, tablet computers, or the like. The entertainment game includes a game engine 612 that generates a player interface 605 for interaction with by a player. The player interface includes a player presentation 635 that is presented to a player through the player interface. The player presentation 635 may be audio, visual or tactile, or any combination of such. The player interface 635 further includes one or more Human Input Devices (HIDs) 630 that the player uses to interact with the entertainment game. Various components or sub-engines of the game engine read data from a game state in order to implement the features of the game. Components of the game engine include a physics engine 640 used to simulate physical interactions between virtual objects in the game state, a rules engine 645 for implementing the rules of the game, an RNG that may be used for influencing or determining certain variables and/or outcomes to provide a randomizing influence on game play, a graphics engine 650 used to generate a visual representation of the game state to the player, an audio engine to generate audio outputs for the player interface, and any other engine needed to provide the entertainment game. The game engine 612 reads and writes game resources 615 stored on a data store of the ESE host. The game resources 615 include game objects 655 having graphics and/or control logic used to implement game world objects of the game engine. The game resources 615 also include video files 675 that are used to generate cut-scenes for the entertainment game. The game resources 615 may also include audio files 660 used to generate music, sound effects, etc. within the entertainment game. The game resources 615 may also include configuration files 670 used to configure the features of the entertainment game. The game resources 615 may also include scripts 665 or other types of control code used to implement various game play features of the entertainment game. The game resources 615 may also include graphics resources 680 including, but not limited to, textures, and objects that are used by the game engine to render objects displayed in the entertainment game.

In operation, components of the game engine 612 read portions of the game state 625 and generate the player presentation for the player which is presented to the player using the player interface 605. The player perceives the presentation 635 and provides player inputs using the HIDs 630. The corresponding player inputs are received as player actions or inputs by various components of the game engine 612. The game engine translates the player actions into interactions with the virtual objects of the game world stored in the game state 625. Components of the game engine 612 use the player interactions with the virtual objects of the game and the game state 625 to update the game state 625 and update the presentation 635 presented to the user. The process loops in a game loop continuously while the player plays the game.

The ESE 610 provides one or more interfaces between an entertainment game and other components 620 of a gambling hybrid game, such as a GWE. The ESE 610 and the other gambling hybrid game component 620 communicate with each other using the interfaces, such as by passing various types of data and sending and receiving messages, status information, commands and the like. Examples of communications include, but are not limited to, requesting by the gambling hybrid game component 620 that the ESE 610 update the game state using information provided by the other component; requesting, by the gambling hybrid game component 620, that the ESE 610 update one or more game resources using information provided by the gambling hybrid game component 620; the ESE 610 providing all or a portion of the game state; the ESE 610 providing one or more of the game resources to the gambling hybrid game component 620; and the ESE 610 communicating player actions to the other gambling hybrid game component 620. The player actions may be low level player interactions with the player interface, such as manipulation of an HID, or may be high level interactions with objects as determined by the entertainment game. The player actions may also include resultant actions such as modifications to the game state or game resources resulting from the player's actions taken in the game. Other examples of player actions include actions taken by entities, such as Non-Player Characters (NPC) of the entertainment game, that act on behalf of, or under the control of, the player.

Elements are a limited resource consumed within an entertainment game to advance entertainment game gameplay. In playing the entertainment game using the elements, a player can (optionally) consume and accrue game world credits (GWC) within the entertainment game. These credits can be in the form of (but are not limited to) game world credits, experience points, or points generally. Wagers can be made in the gambling game as triggered by the player's use of one or more elements of the entertainment game. The wagers are made using real world credits (RC). The real world credits can be credits in an actual currency, or can be credits in a virtual currency which may have a real world value. Gambling outcomes from the gambling game can cause consumption, loss or accrual of RC. In addition, gambling outcomes in the gambling game can influence elements in the entertainment game such as (but not limited to) by restoring a consumed element, causing the loss of an element, restoration or placement of a fixed element. In certain embodiments, gambling games can facilitate the wager of GWC for a randomly generated payout of GWC or a wager of elements for a randomly generated payout of elements. In particular embodiments, an amount of GWC and/or elements used as part of a wager can have a RC value if cashed out of a gameplay session.

Example elements include enabling elements (EE) which are elements that enable a player's play of the entertainment game and whose consumption by the player while playing the entertainment game can trigger a wager in a gambling game. Another non limiting example of an element is a reserve enabling element (REE), which is an element that converts into one or more enabling elements upon occurrence of a release event in skill wagering interleaved game gameplay. Other types of elements include actionable elements (AE) which are elements that are acted upon to trigger a wager in the gambling game and may or may not be restorable during normal play of the entertainment game. Another type of element is a common enabling element (CEE) which as an element that may be shared by two or more players and the use of which by any of the players causes a wager to be triggered.

In progressing through entertainment game gameplay, elements can be utilized by a player during interactions with a controlled entity (CE) which is a character, entity, inanimate object, device or other object under control of a player.

Also, entertainment game gameplay progress and wager triggers can be dependent upon a game world variable such as, but not limited to: a required game object (RGO) which is a specific game object in an entertainment game acted upon for an AE to be completed (such as but not limited to a specific key needed to open a door); a required environmental condition (REC) which is a game state present within an entertainment game for an AE to be completed (such as but not limited to daylight whose presence enables a character to walk through woods); or a controlled entity characteristic (CEC) which is a status of the CE within an entertainment game for an AE to be completed (such as but not limited to a CE to have full health points before entering battle). Although various gameplay resources, such as but not limited to GWC, RC and elements as discussed above, any gameplay resource can be utilized to advance gameplay as well as form the basis for a trigger of a wager as appropriate to the specification of a specific application in accordance with various embodiments of the invention. Various hybrid games are discussed in PCT Application Nos.

PCT/US11/26768, filed Mar. 1, 2011, PCT/US11/63587, filed Dec. 6, 2011, and PCT/US12/50204 filed Aug. 9, 2012, each disclosure of which is hereby incorporated by reference in its entirety.

Figure 7:
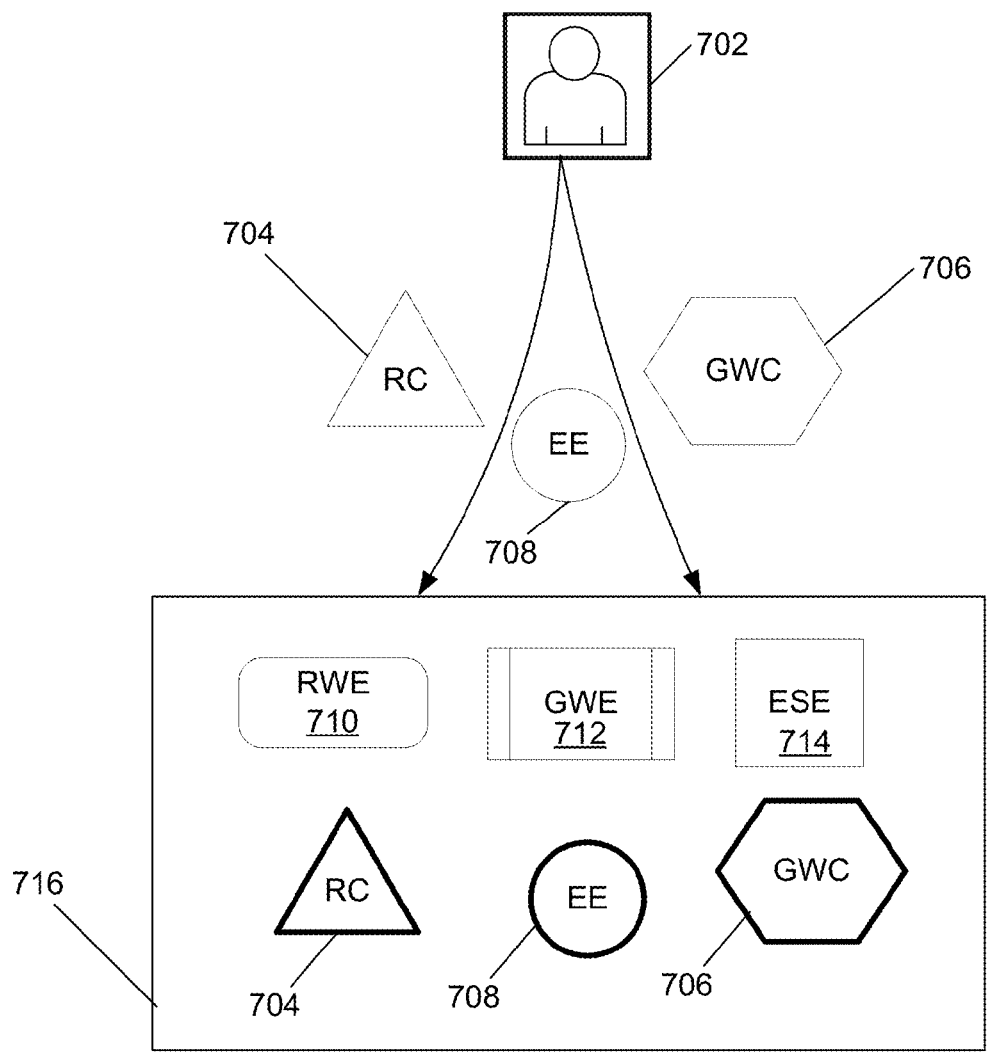
FIG. 7 illustrates a conceptual diagram of interactions between a user and a gambling hybrid game in accordance with embodiments of the invention.

In accordance with some embodiments, a player can interact with a gambling hybrid game by using RC in interactions with a gambling game along with GWC and elements in interactions with an entertainment game. The gambling game can be executed by a RWE while an entertainment game can be executed with an ESE and managed with a GWE. A conceptual diagram that illustrates how resources such as GWC, RC and elements, such as but not limited to enabling elements (EE), are utilized in a gambling hybrid game in accordance with an embodiment of the invention is illustrated in FIG. 7. The conceptual diagram illustrates that RC 704, EE 708 and GWC 706 can be utilized by a player 702 in interactions with the RWE 710, GWE 712 and ESE 714 of a based gambling hybrid game 716. The contribution of elements, such as EE 708, can be linked to a player's access to credits, such as RC 704 or GWC 706. Electronic receipt of these credits can come via a smart card, voucher or other portable media, or as received over a network from a server. In accordance with certain embodiments, these credits can be drawn on demand from a player profile located in a database locally on a gambling hybrid game or in a remote server.

Figure 8:
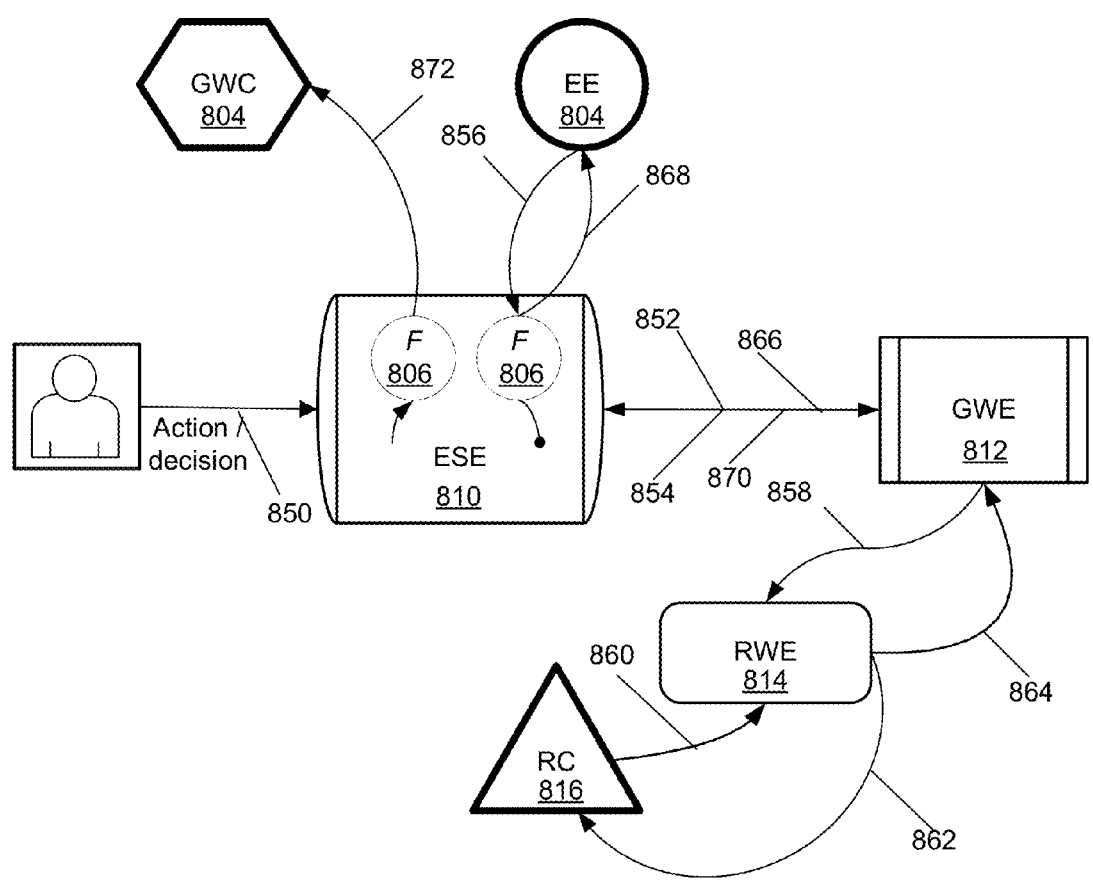
FIG. 8 illustrates a conceptual diagram that illustrates the interplay between aspects of a gambling hybrid game in accordance with some embodiments of the invention using Real World Currency (RC).

A conceptual diagram that illustrates the interplay between aspects of a gambling hybrid game in accordance with an embodiment of the invention using real world credit (RC) is illustrated in FIG. 8. Similar to FIG. 7, a player's actions and/or decisions can affect functions 806 that consume and/or accumulate GWC 802 and/or EE 804 in an entertainment game executed by an ESE 810. A GWE 812 can monitor the activities taking place within an entertainment game executed by an ESE 810 for gameplay gambling event occurrences. The GWE 812 can also communicate the gameplay gambling event occurrences to an RWE 814 that triggers a wager of RC 816 in a gambling game executed by the RWE 814.

In accordance with some embodiments of the invention, the following may occur during use of the gambling hybrid game. The user enters an input that represents an action or decision (850). The ESE 810 signals the GWE 812 with the input decision or action (852). The GWE 812 responds by signaling to ESE 810 with the amount of EE that is consumed by the player action or decision (854). The signaling from the GWE 812 configures a function 806 to control the EE consumption, decay, and/or accumulation.

The ESE 810 then adjusts the EE 804 accordingly (856). The GWE 812 signals the RWE 814 as to the profile of the wager proposition associated with the action or decision and triggers the wager (858). The RWE 814 consumes the appropriate amount of RC 816 and executes the wager (860). The RWE 814 then adjusts the RC 816 based upon the outcome of the wager (862) and informs the GWE 812 as to the outcome of the wager (864).

The GWE 812 signals the ESE 810 to adjust EE to one or more of the EEs of the ESE entertainment game (866). Function 806 of the ESE 810 performs the adjustment of EE 804 (868). The ESE 810 signals the GWE 812 as to the updated status (870). In response, the GWE 812 signals the ESE 810 to update GWC of the entertainment game. The ESE updates the GWC 802 using a function 806 (872).

The following is an example of the above flow in a first person shooter game, such a Call of Duty®, using a gambling hybrid game sequence in accordance with embodiments of the invention.

The process begins by a player selecting a machine gun to use in the game and then fires a burst of bullets at an opponent (850). The ESE 810 signals the GWE 812 of the player's choice of weapon, that a burst of bullets was fired, and the outcome of the burst (852). GWE 812 processes the information received and signals ESE 810 to consume 3 bullets (EE) with each pull of the trigger (854). The ESE 810 consumes 3 bullets for the burst using function 806 (856).

The GWE 812 signals the RWE 814 that 3 credits (RC) are to be wagered to match the three bullets consumed. The RWE 814 then determines the result of the wager and may determine the winnings from a pay table. On a particular pay table (Table Ln-RC), a determination is made by RWE 814 as to the amount of damage that the opponent has sustained. The RWE 814 consumes 3 credits of RC 816 for the wager and executes the specified wager (860). The RWE 814 determines that the player hit a jackpot of 6 credits and returns the 6 credits to the RC 816 (862) and signals the GWE 812 that 3 net credits were won by the player (864).

The GWE 812 signals ESE 810 to add 3 bullets to an ammunition clip (866). ESE 810 adds 3 bullets back to the ammo clip (EE 804) using a function 806 (868). The ammunition may be added by directly adding the ammunition to the clip or by allowing the user to find extra ammunition during game play. The GWE 812 logs the new player score (GWC 802) in the game (as a function of the successful hit on the opponent) based on the ESE 810 signaling, and the signals the ESE 810 to add 2 extra points to the player score since a jackpot has been won (870). The ESE 810 then adds 10 points to the player score (GWC 802) given the success of the hit which in this example is worth 8 points, plus the 2 extra points requested by GWE 812 (872). Note that the foregoing example is only intended to provide an illustration of how credits flow in a gambling hybrid game, but is not intended to be exhaustive and only lists only one of numerous possibilities of how a gambling hybrid game may be configured to manage its fundamental credits.

Figure 9:
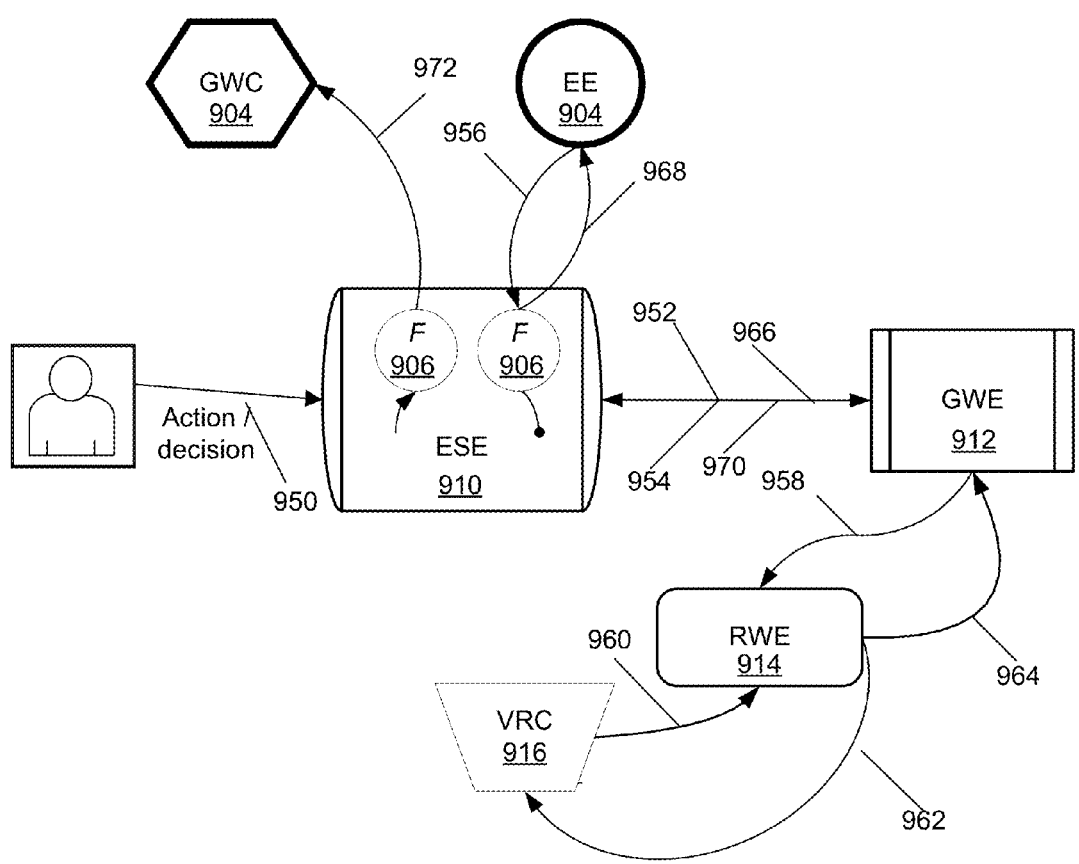
FIG. 9 illustrates a conceptual diagram that illustrates the interplay between aspects of a gambling hybrid game in accordance with other embodiments of the invention using Virtual Real World Currency (VRC).

A conceptual diagram that illustrates the interplay between aspects of a gambling hybrid game in accordance with an embodiment of the invention using virtual real world credit (VRC) is illustrated in FIG. 9. As seen in the FIG. 9, substituting VRC in place of RC is effected without impact to the architecture or operation of the gambling hybrid game. The implementation of FIG. 9 is not the only embodiment using virtual currency within a gambling hybrid game, but shows only one permutation of which many could exist.

Similar to FIG. 8, a player's actions and/or decisions can affect functions 906 that consume and/or accumulate GWC 902 and/or EE 904 in an entertainment game executed by an ESE 910 in the process shown in FIG. 9. A GWE 912 can monitor the activities taking place within an entertainment game executed by an ESE 910 for gameplay gambling event occurrences. The GWE 912 can also communicate the gameplay gambling event occurrences to a RWE 914. Unlike the process shown in FIG. 8, RWE 914 triggers a wager of virtual real world credit (VRC) 916 in a gambling game executed by the RWE 914.

For purposes of this discussion, VRC can be thought of as a form of alternate currency, which can be acquired, purchased or transferred, in unit or in bulk, by/to a player, but does not necessarily directly correlate to RC or real currency. As an example, there is a virtual currency called "Triax Jacks", 1000 units of which are given to a player by an operator of a gambling hybrid game, with additional blocks of 1000 units being available for purchase for $5 USD each block. Triax Jacks could be redeemed for various prizes, or could never be redeemed but simply used and traded purely for entertainment value by players. It would be completely consistent with the architecture of the gambling hybrid game that Triax Jacks would be wagered in place of RC, such that the gambling hybrid game could be played for free, or with played with operator sponsored Triax Jacks.

Returning to the process in FIG. 9, the following may occur during use of the gambling hybrid game in accordance with embodiments of the invention. The user enters an input that represents an action or decision (950). The ESE 910 signals the GWE 912 with the input decision or action (952). The GWE 912 responds by signaling to ESE 910 with the amount of EE that is consumed by the player action or decision (954). The signaling from the GWE 912 configures a function 906 to control the EE consumption, decay, and/or accumulation.

The ESE 910 then adjusts the EE 904 accordingly (956). The GWE 912 signals the RWE 914 as to the profile of the wager proposition associated with the action or decision and triggers the wager (958). The RWE 914 consumes the appropriate amount of RC 916 and executes the wager (960). The RWE 914 then adjusts the RC 916 based upon the outcome of the wager (962) and informs the GWE 912 as to the outcome of the wager (964).

The GWE 912 signals the ESE 910 to adjust EE to one or more of the EEs of the ESE entertainment game (966). Function 906 of the ESE 910 performs the adjustment of EE 904 (968). The ESE 910 signals the GWE 912 as to the updated status (970). In response, the GWE 912 signals the ESE 910 to update GWC 902 of the entertainment game. The ESE updates the GWC 902 using a function 906 (972).

Network Based Gambling Hybrid Game

Figure 10:
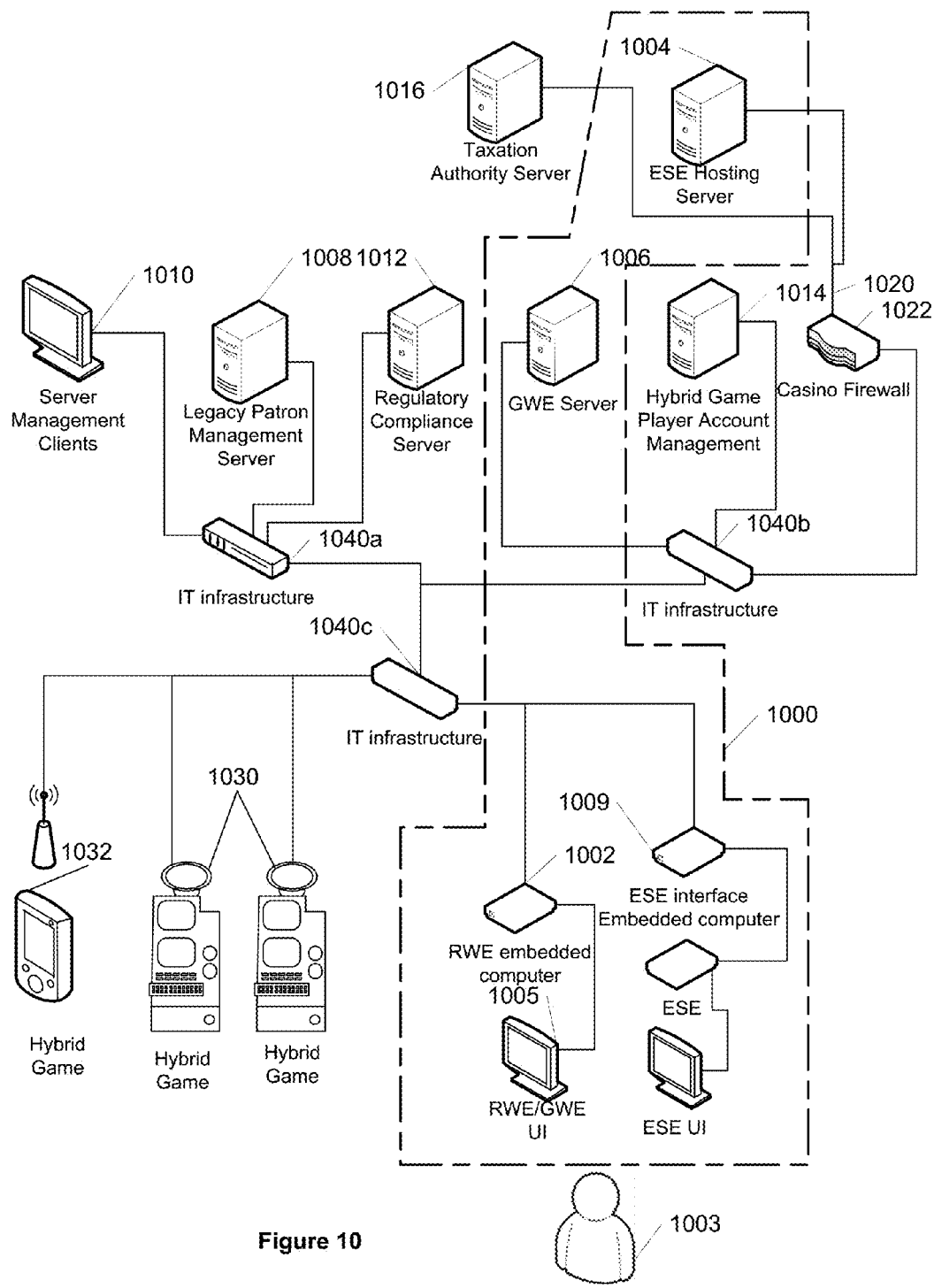
FIG. 10 illustrates a system diagram of an implementation of a network based gambling hybrid game in accordance with another embodiment of the invention.

A system diagram that illustrates an implementation of a network distributed gambling hybrid game with a GWE local server in accordance with embodiments of the invention is illustrated in FIG. 10. In the figure, the gambling hybrid game 1000 includes components, RWE 1002 embedded in a device used as the user interface for player 1003. The device provides both a RWE/GWE user interface 1005 and an ESE user interface 1007 for the player. The ESE is provisioned by an ESE hosting server 1004 via ESE interface 1009, and the GWE is provisioned by GWE server 1006 as indicated by the dashed line. Also pictured in the diagram are a number of other peripheral systems, such as player management 1008, casino management 1010, regulatory 1012, hybrid game player account management 1014, and taxation authority 1016 hosting servers that may be present in such an implementation. FIG. 10 also illustrates various other systems, which may reside outside the bounds of the casino and are connected to the framework via communications network, such as the Internet 1020, depicted by the connection lines past the casino firewall 1022. The end devices utilized for user interfaces for a gambling hybrid game include, but are not limited to, casino electronic game machines 1030 and wireless or portable devices, such as smart phone 1032, personal digital assistants, tablet computers, video gaming consoles or the like. These disparate devices are connected within and without the casino through the casino's information technology structure as illustrated by routers 1040a, 1040b and 1040c. It should be understood that FIG. 10 does not attempt to illustrate all servers and systems to which a gambling hybrid game 1000 might be inevitably be connected, and indeed one might expect there would be others, but rather provides an example of a set of a sub-set of systems which would be present in an exemplary embodiment of an installation.

Figure 11:
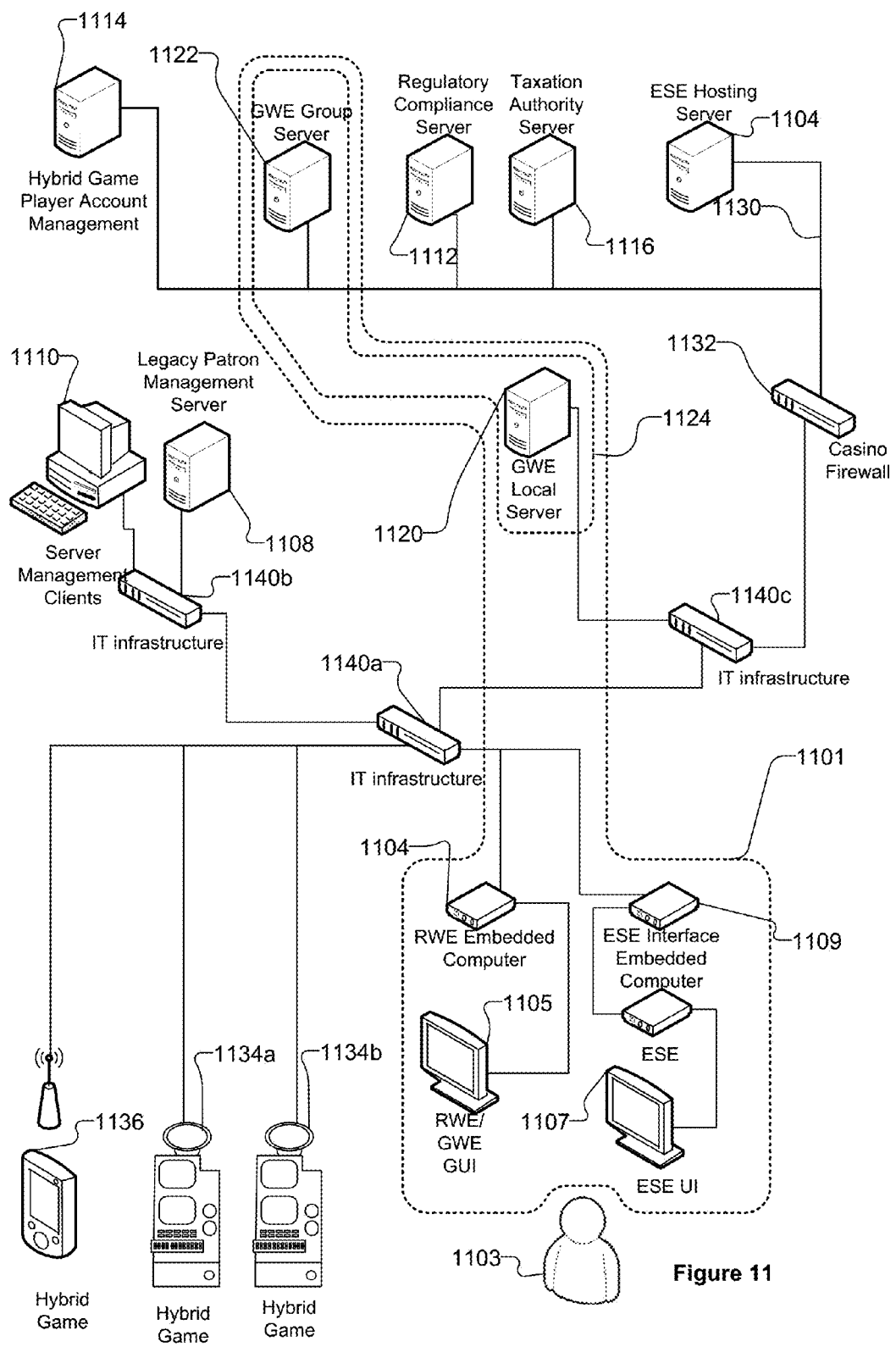
FIG. 11 illustrates a system diagram of an implementation of an Internet based gambling hybrid game in accordance with an embodiment of the invention.

FIG. 11 is a diagram showing another implementation of a gambling hybrid game in accordance with an exemplary embodiment. In the figure, the gambling hybrid game 1101 includes components, RWE 1104 embedded in a device used as the user interface for player 1103. The device provides both a RWE/GWE user interface 1105 and an ESE user interface 1007 for the player. The ESE is provisioned by an ESE hosting server 1104 via ESE interface 1109. Also pictured in the diagram are a number of other peripheral systems, such as player management 1108, casino management 1110, regulatory 1112, hybrid game player account management 1114, and taxation authority 1116 hosting servers that may be present in such an implementation. In the figure, note that the GWE is composed of two sub-components, a local GWE server 1120, and a cloud server 1122. (components within the dash line area 1124). In the figure, certain of the components are located within the bounds of the casino, namely the RWE, the ESE and a portion of the GWE, namely the local GWE server 1120. The Cloud Server GWE 1122 is located in the cloud connected to the casino bounded gambling hybrid game components via communications network such as the Internet 1130 through a firewall 1132. FIG. 11 also illustrates various other systems, which may reside outside the bounds of the casino and are connected to the framework via communications network. The end devices utilized for user interfaces for a gambling hybrid game include, but are not limited to, casino electronic game machines, 1134a and 1134b, and wireless or portable devices, such as smart phone 1136, personal digital assistants, tablet computers, video gaming consoles or the like. These disparate devices are connected within and without the casino through the casino's information technology structure as illustrated by routers 1140a, 1140b and 1140c. It should be understood that FIG. 11 does not attempt to illustrate all servers and systems to which a gambling hybrid game might be inevitably be connected, and indeed one might expect there would be others, but rather provides an example of a set of a sub-set of systems which would be present in an exemplary embodiment of an installation.

Figure 12:
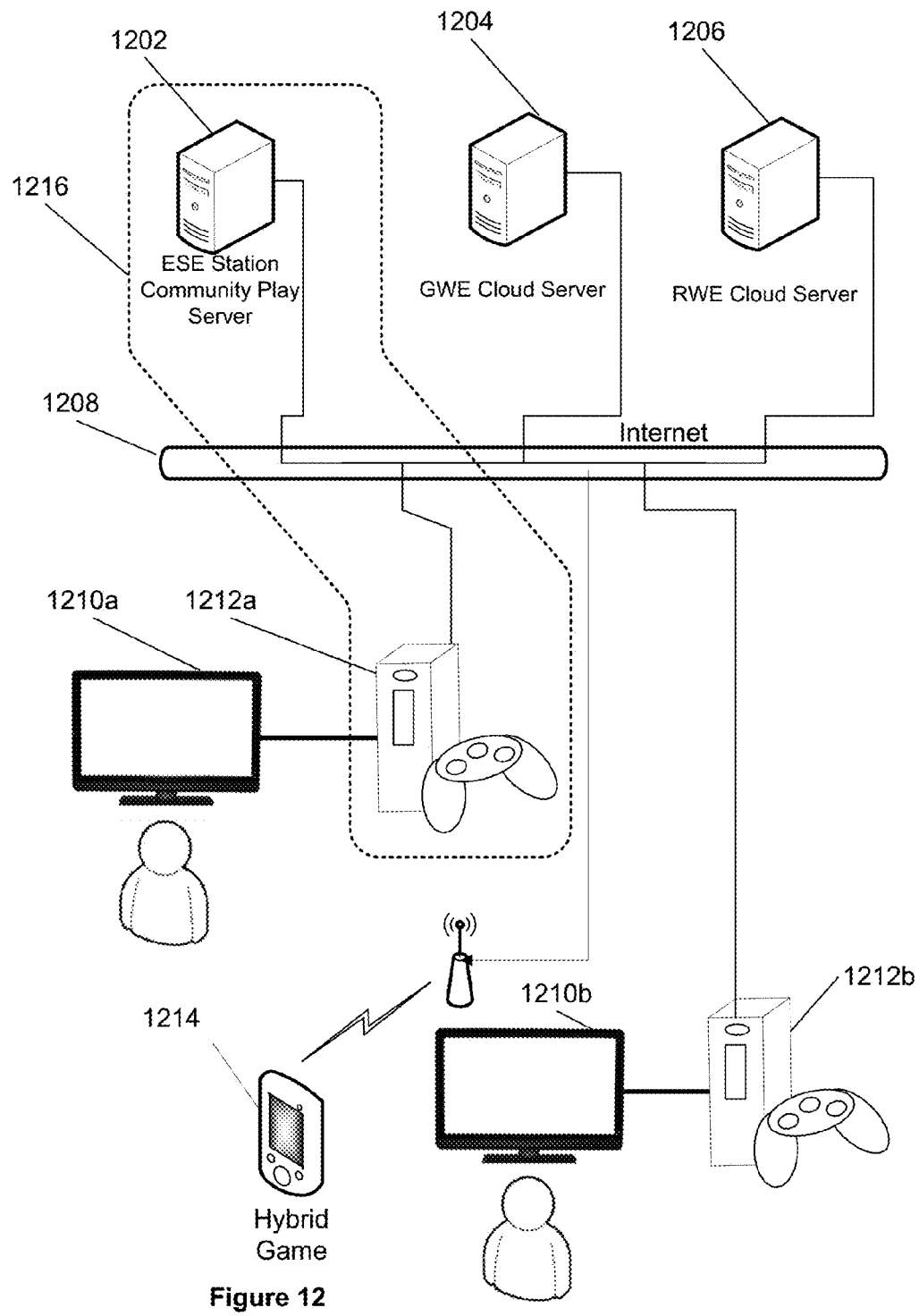
FIG. 12 illustrates a system diagram of an implementation of a cloud based gambling hybrid game in accordance with embodiments of the invention.

A system diagram that illustrates an implementation of network a cloud based gambling hybrid game over the Internet in accordance with an embodiment of the invention is illustrated in FIG. 12. The system includes an ESE server 1202, GWE server 1204 and RWE server 1206 that each connect to a user interface, 1210a or 1210b, (such as, but not limited to, a television screen, computer terminal, tablet, touchscreen or PDA) of gambling hybrid games over the Internet 1208. Each gambling hybrid game includes a local ESE 1212a or 1212b (such as, but not limited to, a video game console or a gaming computer system) that interfaces with a remote ESE server 1002. Processes performed by an ESE 1212a services can be performed in multiple locations, such as, but not limited to, remotely on an ESE server 1202 and locally on a local ESE 1212a. In addition, a gambling hybrid game may include a Personal Digital Assistant (PDA) 1214 or other type of mobile computing device game coupled to the ESE hosting server 1202, thus providing the opportunity for a player to play a gambling hybrid game on the PDA through a mobile phone or data network.

There are many possible permutations of how a gambling hybrid game could be constructed, with FIGS. 10, 11 and 12 showing only three possible permutations and provided as examples, which are not intended to suggest limitations to the forms of the architecture. Other embodiments include a version where the entire gambling hybrid game is in the cloud with only a client running on player terminal within the bounds of the casino, or a version where the RWE and GWE are casino bound and the ESE exists in the cloud, accessed by a client running on a terminal in the casino.

Processing Apparatuses

Figure 13:
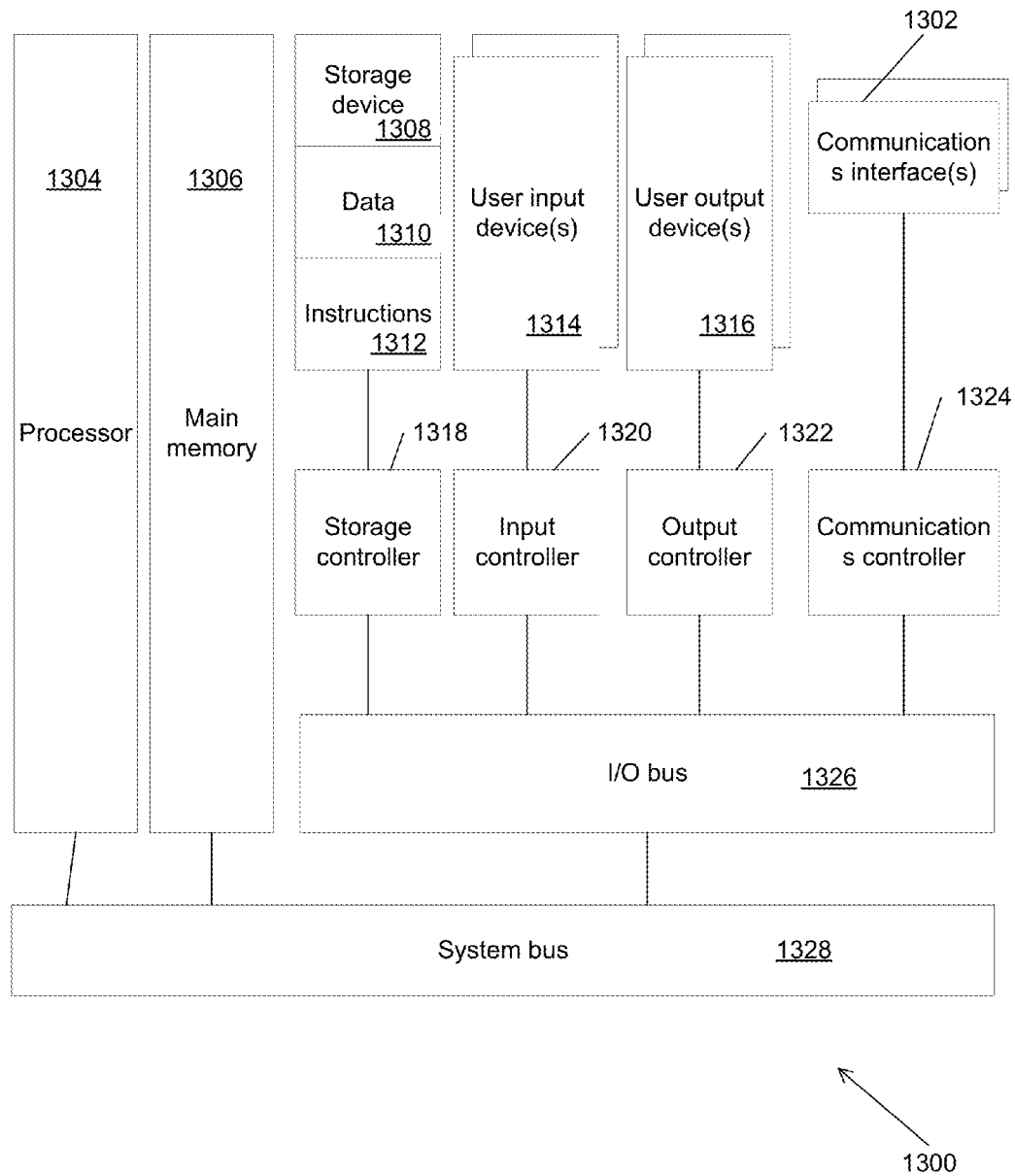
FIG. 13 illustrates a block diagram of components of a device implementing a gambling hybrid game in accordance with an embodiment of the invention.

Any of a variety of processing apparatuses can host various components of a gambling hybrid game in accordance with embodiments of the invention. In accordance with embodiments of the invention, these processing apparatuses can include, but are not limited to, mobile device such as a smartphone, personal digital assistant or the like, a wireless device such as a tablet computer or the like, an electronic gaming machine, a general purpose computer, a computing device and/or a controller. A processing apparatus that is constructed to implement a gambling hybrid game in accordance with embodiments of the invention is illustrated in FIG. 13. In the processing apparatus 1300, a processor 1304 is coupled to a memory 1306 by a bus 1328. The processor 1304 is also coupled to processor-readable storage media, such as a storage device 1308 that stores processor-executable instructions 1312 and data 1310 through the system bus 1328 to an I/O bus 1326 through a storage controller 1318. The processor 1304 is also coupled to one or more interfaces that can be used to connect the processor to other processing apparatuses as well as networks as described herein. The processor 1304 is also coupled via the bus to user input devices 1314, such as tactile devices including, but not limited to, keyboards, keypads, foot pads, touch screens, and/or trackballs; as well as non-contact devices such as audio input devices, motion sensors and motion capture devices that the processing apparatus can use to receive inputs from a user when the user interacts with the processing apparatus. The processor 1304 is connected to these user input devices 1314 through the system bus 1328, to the I/O bus 1326 and through the input controller 1320. The processor 1304 is also coupled via the bus to user output devices 1316 such as (but not limited to) visual output devices, audio output devices, and/or tactile output devices that the processing apparatus uses to generate outputs perceivable by the user when the user interacts with the processing apparatus. In accordance with some embodiments, the processor is coupled to visual output devices such as (but not limited to) display screens, light panels, and/or lighted displays. In accordance with particular embodiments, the processor is coupled to audio output devices such as (but not limited to) speakers, and/or sound amplifiers. In accordance with many of these embodiments, the processor 1304 is coupled to tactile output devices like vibrators, and/or manipulators. The processor 1304 is connected to output devices from the system bus 1328 to the I/O bus 1326 and through the output controller 1322. The processor 1304 can also be connected to a communications interface 1302 from the system bus 1328 to the I/O bus 1326 through a communications controller 1324.

In accordance with various embodiments, a processor 1304 can load instructions and data from the storage device into the memory 1306. The processor 1304 can also execute instructions that operate on the data to implement various aspects and features of the components of a gambling hybrid game. The processor 1304 can utilize various input and output devices in accordance with the instructions and the data in order to create and operate user interfaces for players or operators of a gambling hybrid game (such as but not limited to a casino that hosts the gambling hybrid game).

Although the processing apparatus 1300 is described herein as being constructed from a processor and instructions stored and executed by hardware components, the processing apparatus can be composed of only hardware components in accordance with other embodiments. In addition, although the storage device is described as being coupled to the processor through a bus, those skilled in the art of processing apparatuses will understand that the storage device can include removable media such as, but not limited to, a USB memory device, an optical CD ROM, magnetic media such as tape and disks. Also, the storage device can be accessed by processor 1304 through one of the interfaces or over a network. Furthermore, any of the user input devices or user output devices can be coupled to the processor 1304 via one of the interfaces or over a network. In addition, although a single processor 1304 is described, those skilled in the art will understand that the processor 1304 can be a controller or other computing device or a separate computer as well as be composed of multiple processors or computing devices including one or more processors.

Provision of a Fantasy Sports Entertainment Game by a Gambling Hybrid Game

Figure 14:
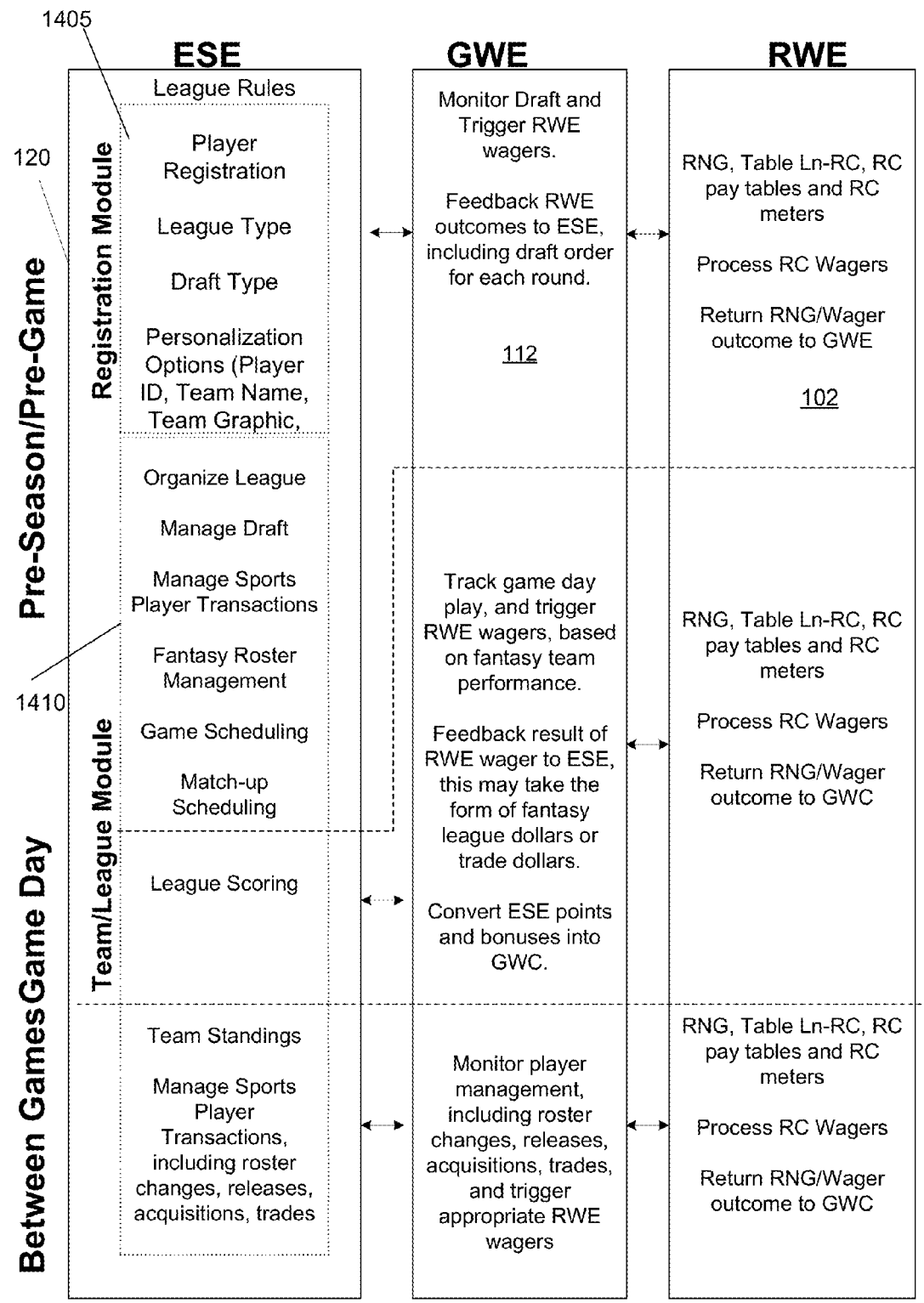
FIG. 14 illustrates a conceptual diagram showing the functions performed by each of the engines in a gambling hybrid game having a fantasy sports game as an entertainment game in accordance with embodiments of the invention.

In accordance with some embodiments of a gambling hybrid game, the gambling hybrid game (HyG) provides a fantasy sports league as an entertainment game that allows players the opportunity to participate in fantasy league play, with the addition of a real world based gambling element. While the outcome of the gambling element may be based solely on the outcome of an RNG based gaming module. In accordance with many of these embodiments, the gambling hybrid game offers an enriched gaming experience, based on fantasy sports league play which through the game world engine (GWE) 112 of the gambling hybrid game, triggers real world gambling events via the real world engine (RWE) 102. The general architecture of the gambling hybrid game providing a sports fantasy game for entertainment in accordance with embodiments of the invention is shown in FIG. 14.

In some embodiments, RWE 102 gambling event triggers may be based upon player actions, such as drafting, trading, or making other roster changes with respect to the sports players on the player's fantasy team. The outcome of the RWE 102 gambling events are provided to the ESE 120, and may be used to enrich or modify the entertainment aspect of the game.

In other embodiments, RWE 102 gambling event triggers may be based upon sporting events that are tracked by the entertainment software engine (ESE) 120. The outcome of the RWE 904 gambling events are provided to the ESE 120, and may be used to enrich or modify the entertainment aspect of the game. The casino or player may have the ability to throttle or parameterize the maximum amount to be gambled or lost on a wager on the gambling event during a specified period of play.

In accordance with some of these embodiments, in a fantasy sports implementation of a HyG, the ESE 120 contains the elements which manage the fantasy league, including a registration module 1405, league and team management modules 1410, including draft and transaction modules. Other aspects of the entertainment game that manage and run the fantasy league may also be included in the ESE 120.

The registration module 1405 of the ESE 120 includes elements that register a player for a league, including the collection of personal information, as required by the operator of the game; and the necessary information for regulatory compliance. The specified registration module 1405 may also contain the rules, regulations, terms and conditions for entry in to the HyG based fantasy sports league. Additionally, this module may offer choices of league type, including options such a rotisseries league, head to head or others, as may be appropriate to the specific sport for which the league is being formed.

The league/team management module 1410 of the ESE 120 is responsible for providing such functions as league formation, sport player draft management, team roster management, sport player transactions (e.g. trades, placing or claiming players on waivers), game schedule management, score keeping and/or team ranking based upon league rules.

Figure 15:
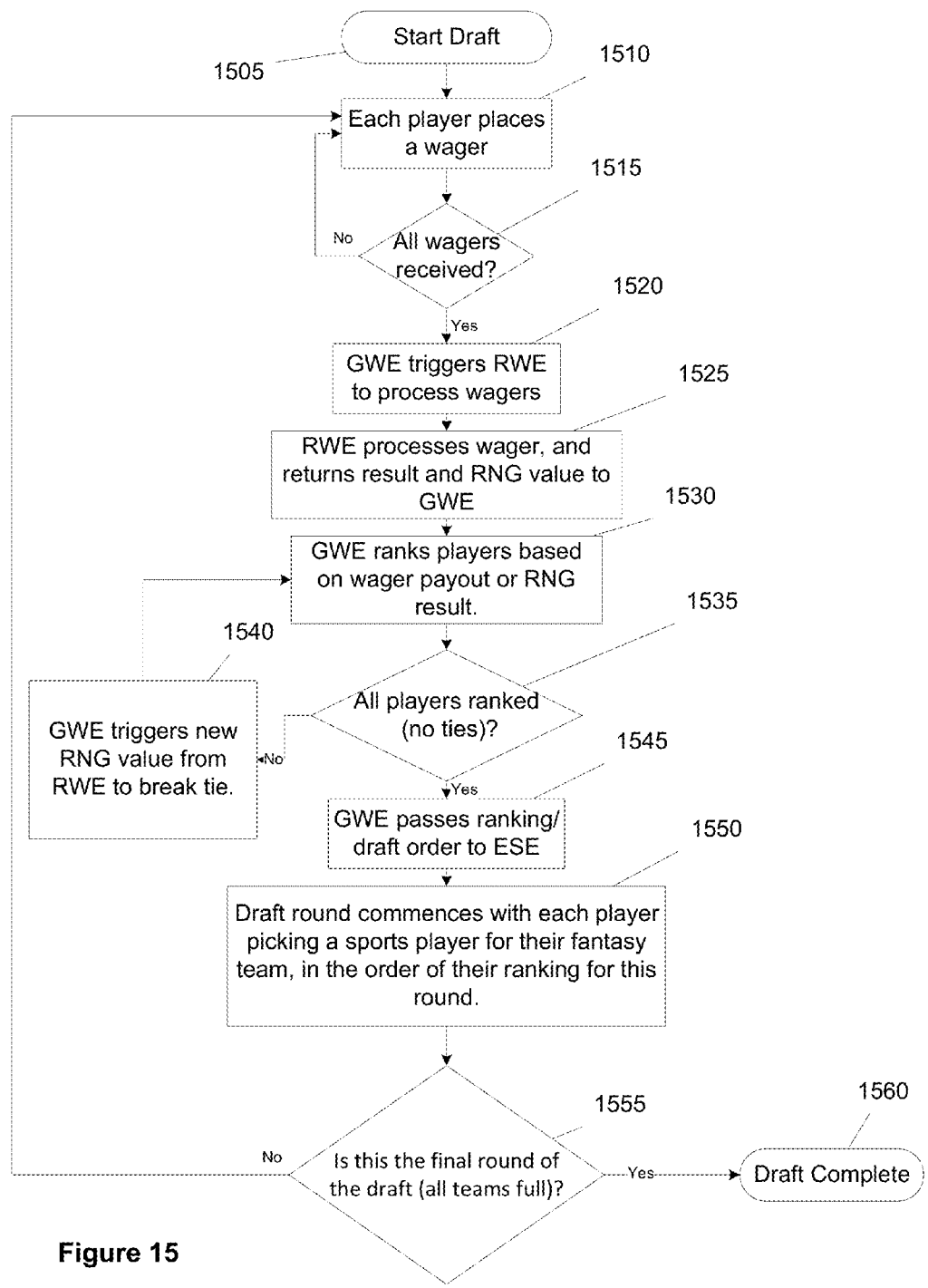
FIG. 15 illustrates a flow diagram of process performed by a gambling hybrid game providing a fantasy sports game as an entertainment game during a drafting process in the game in accordance with embodiments of the invention.

A gambling hybrid game in accordance with embodiments of the invention may trigger gambling events to each round of a draft for a fantasy sports league in which a sports player is chosen for the team of a participating player and the wagers associated with gambling events in order to determine the drafting order for the round. A process for providing gambling events to determine draft order for each round of a draft for a fantasy sports league in accordance with embodiments of the invention is shown in FIG. 15. In process 1500, the draft session begins (1505). At the start of a round of the draft, each member of the league places an RC wager on the outcome of a gambling event (1510) via ESE 120 until all of members have placed a wager (1515). The amount of the wager is specified by the casino, the league commissioner, the service provider and/or regulatory authorities providing managing the fantasy league. The RWE 102 contains an RNG, as well as Table Ln-RC, RC pay tables and RC meters, to determine the result of the gambling event and the results of RC wager by each player.

After all of the wagers are received, the GWE 112 triggers RWE 102 to determine the results of the gambling event and the wagers on the event (1520). RWE 102 determine the gambling results and processes the wagers in response to the trigger and returns the results of the wager and/or the RNG values generated to the GWE 112 (1525). The GWE then determines the drafting order for the round of the draft based on the results of the gambling events and/or wagers placed (1530). In accordance with some particular embodiments, the draft order of the players is determined in the following manner. An RNG value generated for each player by the RWE 102 is provided to the GWE 112. The GWE 112 ranks the values of the players in an order of 1 to n (where n is the number of teams in the league), based on the outcome of the gambling event, and/or the RNG value returned by the RWE 102. The GWE then detects any ties during the ranking process (1535). In the case of a tie between two or more players, a new RNG result could be requested by the GWE 112 and used to resolve the tie (1540).

The GWE 112 returns the draft order results to the ESE 120 for the draft round based on the ranking of each player's team 1 to n (1545). The draft round commences with the player/owner of the $1^{st}$ ranked team selecting a sports player for their team, then the player/owner of the $2^{nd}$ ranked team selects a sports player for their team, this continues in order, until the $n^{th}$ ranked player makes their selection of the sports player for their team and the round ends (1550). If the round completed is the final round of the draft, the draft is completed (1560). Otherwise, process 1500 is repeated for another round of the draft.

In accordance with other embodiments of the gambling hybrid game providing a fantasy sports game, the potential exists that a player could enter a fantasy sports scenario, where the player plays against a computer. In accordance with still other embodiments, the player may play in a league which has a non-exclusive draft, in which multiple players could draft the same sports player(s) onto their teams. In accordance with these embodiments, the option could exist for a draft that is held, much in the same manner as above.

In these cases, the enabling element (EE) of draft order is no longer relevant. Thus, the result of the RWE 102 gambling event and associated wagers could be converted into a different type or form of enabling element, such as draft dollars, by the GWE 112. Where a positive outcome of the RWE could result in maximum dollars being awarded for a draft round, and a lesser outcome would result in less draft dollars to draft a player in a given round. During the draft round, a player would draft sports players based only on the draft dollars they have available to spend. Therefore, a player with a favorable gambling outcome would have more draft dollars to spend, than a player with a less favorable gambling outcome, and could potentially draft a higher value sport player for their fantasy team.

Figure 16:
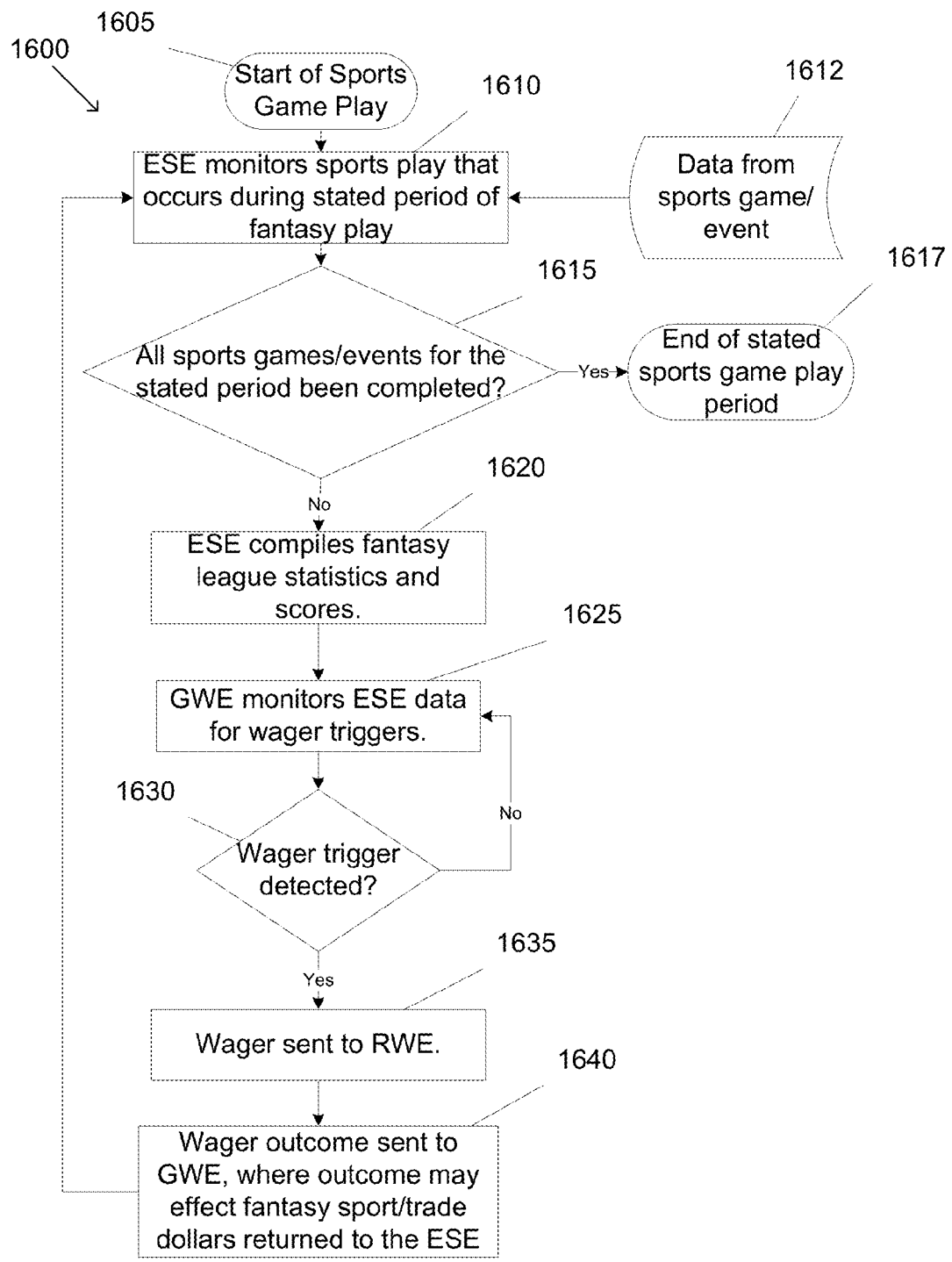
FIG. 16 illustrates a flow diagram of process performed by a gambling hybrid game providing a fantasy sports game as an entertainment game during seasonal play in the game in accordance with embodiments of the invention.

In addition to gambling events based on the drafting of a fantasy team, a gambling hybrid game system providing a fantasy sports game may trigger gambling events based on performance during league play. In accordance with some of these embodiments, the GWE 1122 includes the elements to track the performance of the fantasy sports team(s) of a player(s) in a league. In accordance with some of these embodiments, the ESE 120 awards appropriate GWC, based on the fantasy team's performance, play against another fantasy team, league standing, etc. Another function of the GWE 112 in this system is to trigger RWE 102 gambling events based on actions monitored from the ESE 120. As an example, a fantasy football league may be structured such that a wager is triggered once for each quarter in a game, in which a football player on the player's fantasy team participates in the game. In such a scenario, up to four wagers could be triggered per starting player per game in a standard four quarter game. A process for providing gambling events based upon the monitored results of fantasy league play in accordance with embodiments of the invention is shown in FIG. 16. Process 1600 begins at the start of play of the sporting events monitored for league play (1605). The ESE 120 monitors the sports play in a sport that occurs during a stated period of fantasy league play (1610) by monitoring data about the sporting events provided by another source (1612). The ESE monitors for the end of play of the sporting events for the stated period (1615) and ends the period of fantasy play (1617).

Until play of the period is completed, the ESE 120 compiles fantasy statistics and scores for the each team in the fantasy league and/or game played between the fantasy teams in league play (1620). The GWE 112 monitors the data being provided by the ESE 120 about the play of the sports players and detects gambling event triggers based on the data (1625). If a gambling event is detected (1630). A gambling event with the RWE 102 is triggered by the GWE 112. The result of the gambling event and any wagers on the gambling event are then sent to the GWE 112. The GWE 112 uses the results of the gambling events and/or wagers to affect the fantasy sport/trade dollars provided to the player via the ESE 120.

In accordance some embodiments of a fantasy sports implementation of a gambling hybrid game, the result of a gambling event and associated wagers resolved by the RWE 102, may be processed on the GWE 112 to generate feedback to the ESE 120. One example could be that the result of the wager outcome could influence trade dollars or sports dollars that could be earned for each wager placed. For example, a successful wager would result in a greater amount of trade/sports dollars than an unsuccessful wager. These trade/sports dollars could be accumulated and used to purchase free agent sports players, to sign players from a waiver wire, or as consideration in trading fantasy sports players within a fantasy sports league.

In accordance with some embodiments of a fantasy sports implementation of a gambling hybrid game, the RWE 102 may contain an RNG, as well as Table Ln-RC, RC pay tables and RC meters, to process RC wagers on the results of a gambling event, as triggered by the GWE 112.

In accordance with some of these embodiments, the fantasy sports league may be formed to play based on the results of one event, one day, one weekend, one week or some other finite period. Example of these periods include, but are not limited to, a fantasy race league which is formed for one specific race, or a fantasy football league which is formed for one specific professional football games played during a particular week. This type of play lends well to on-line gaming, as well as land based gaming, in which a player is visiting the land based casino for a short period of time.

In accordance with other of these embodiments, the fantasy sports league may be formed for play over several weeks, an entire season, or an entire post season of play of a particular sports league. Examples of these types of fantasy leagues include, but are not limited to a fantasy race league formed for the NASCAR Sprint Cup chase to the championship (10 races), or a league formed for the entire (or a portion of) the regular season of NFL play. While this type of fantasy league play could be accommodated by a land based casino, these types of leagues tend to be implemented via on-line gaming. In a multi-week sports fantasy league, the additional element of dropping and adding sports players, as well as trading of sports players between teams, as described above may come into play.

In the various embodiments of a fantasy sports implementation of a gambling hybrid game, an additional aspect to fantasy league play is the potential for a tournament play option. Entry into a gambling hybrid game tournament may be based upon standings and/or GWC earned, as tracked by the GWE 112. In a fantasy league scenario, tournaments could take on one of several forms, which could include weekly winners based on current performance of player's fantasy team for a specified period of time, cumulative performance (season to date), performance based upon the entire season of play and/or a post season tournament, in which the top performers from the season may be eligible to enter. Entry into a post season tournament could be based upon a minimum buy-in of GWC, or the potential exists for multiple tournaments, entry into which may be skill level based, so players are matched against other players, which had a similar skill level or GWC earnings over the course of a season.

Examples of Fantasy Sports Implementations of a Gambling Hybrid Game

The following are examples of fantasy sports implementations of gambling hybrid games in accordance with embodiments of the invention. One skilled in the art will recognize that gambling hybrid games that provide fantasy sports games for other sports may be provided in similar manners using similar scoring rules; and triggers for gambling events and associated wagers.

Football

A first example is a gambling hybrid game that provides a fantasy football league. In this example, a player joins a gambling hybrid game based fantasy football league by registering for the league in a manner consistent with that described above. Options for the league that could be part of the registration process could include league type (public or private); draft type (live or automatic); and other rules or league options that could be selectable at the time of registration. Additionally, personalization options could include, but are not limited to, the opportunity for the player to select a team name, a team graphic/logo, or other features to personalize league play.

Once registered, the player is assigned to a league, based on the type of entry they have chosen. The league module assigns a draft date and time, once the league is filled with the pre-specified number of teams. At the appropriate date and time, a draft (live or automatic) is conducted, in order for the teams to fill their rosters. In accordance with some embodiments, the draft may include wagering elements, which could be used to influence draft pick order and/or draft dollars, as described above. The player then selects players to provide a team that complies with rules of the league. For example, league rules may require certain positions on the team roster be filled. The following is a non-limiting example of league rules requiring certain players on the team:

1 Quarterback (QB)
2 Wide Receivers (WR)
1 Tight End (TE)
1 Linebacker/Wide Receiver (LB/WR)
2 Running Backs (RB)
1 Place Kicker (PK)
6 Bench Players
2 Defense/Special Teams (DST)

Once the teams have been filled, the league is effectively complete and the potential exists for player to make roster changes via trades, releasing players, claiming players off waivers, etc. per league rules. In accordance with some embodiments, the ability to make roster changes or trades may be influenced by sports dollars earned, as a result of wagering outcomes, as described above.

Fantasy league play typically commences with NFL play, and each team is scored each week, as a function of the play of each sport team player and the DST of the fantasy football team. Following is an example of the scoring for the teams:

Passing:
TD Pass=4 pts
Every 25 passing yards=1 pts
2 pt Passing Conversion=2 pts
Interceptions Thrown=−2 pts
Rushing:
TD Rush=6 pts
Every 10 rushing yards=1 pt
2 pt Rushing Conversion=2 pts
Receiving:
TD Reception=6 pts
Every 10 receiving yards=1 pt
2 pt Receiving Conversion=2 pts
Misc. Offense:
Kickoff Return TD=6 pts
Punt Return TD=6 pts
Fumble Recovered for TD=6 pts
Each Fumble Lost=−2
Kicking:
FG Made (50+ yards)=5 pts
FG Made (40-49 yards)=4 pts
FG Made (0-39 yards)=3 pts
Each PAT Made=1 pt
FG Missed (any distance)=−1
(Team) Defense/Special Teams:
Kickoff Return TD=6 pts
Punt Return TD=6 pts
Interception Return TD=6 pts
Fumble Return TD=6 pts Blocked Punt or FG return for TD=6 pts
Each Interception=2 pts
Each Fumble Recovered=2 pts
Blocked Punt, PAT or FG=2 pts
Each Safety=2 pts
Each Sack=1 pts
0 points allowed=5 pts
1-6 points allowed=4 pts
7-13 points allowed=3 pts
14-17 points allowed=1 pt
18-27 points allowed=0pts
28-34 points allowed=−1 pts
35-45 points allowed=−3 pts
46+ points allowed=−5 pts
Under 100 yards allowed=5 pts
101 to 199 yards allowed=3 pts
200 to 299 yards allowed=2 pts
300 to 349 yards allowed=0 pts
350 to 399 yards allowed=−1 pts
400 to 449 yards allowed=−3 pts
450 to 499 yards allowed=−5 pts
500-549 yards allowed=−6 pts
550+ yards allowed=−7 pts Scoring and scoring options may vary, depending on league, league type, special scoring options, etc. The above is shown as an example, and it not intended to be all inclusive. The results of weekly play and fantasy league scoring are compiled and managed by the ESE 120. In accordance with some embodiments, the scoring is compiled on a real time basis, as play progresses in any individual game, in which a player's fantasy football team members are involved. In another embodiment, the scoring is compiled after all games on a given week have been completed.

The GWE 112 monitors and receives input from the ESE 120. Functions of the GWE in the fantasy football implemented gambling hybrid game include conversion of ESE play and points into GWC and to trigger gambling events resolved by RWE 102 and to provide RC based wagers on the results of the gambling event. In a fantasy football scenario, a wager trigger could be based on events such as a fantasy football league point earning play occurring in the ESE 120; a scoring play involving a member of the player's team; a quarter in which a member of the player's team plays; and a game in which a member of the player's team plays. These examples are not intended to be an exhaustive list, but are intended to show examples of events which might trigger an RC gambling proposition within the RWE.

In accordance with some embodiments, the GWE 112 has the ability to trigger a gambling event for RWE 102 on a real-time basis, as the ESE 120 tracked real-time football play. In this case, wagers on the gambling events would effectively have to be preloaded into the gambling hybrid game. In accordance with some other embodiments, scoring for the fantasy league takes place at the close of play, either on a game by game or week by week basis. In order for the player's league play to be recorded by the GWE 112, and converted to GWC, a wager may be placed, the amount of the wager and/or the table Ln-RC may be set by the results of play as monitored by the ESE 120. Additionally, in accordance with some embodiments, the outcome of the wager on a gambling event results in fantasy sports dollars for future roster changes or fantasy sports player trade consideration.

During play of the sports game, the results may be sent to the player, via the internet, or a wireless device. The option may exist to push results from the gambling hybrid game to a player's smartphone or other wireless device. In a multi-week fantasy league as described above, once play has completed for a given week, the opportunity may exist for players to make roster changes, which may include moving players to/from the active roster to/from the bench, releasing players, adding free agents, picking-up waivered players, trading players to/from other fantasy teams in the player's league. As noted above, this element of the league may involve fantasy credits or fantasy dollars earned from the outcome of wagers made as part of the previous weeks fantasy league play.

Baseball

A second example of a fantasy sport implemented gambling hybrid game is a fantasy baseball league game. In accordance with embodiments providing a fantasy baseball league, a player enters into a gambling hybrid game based fantasy baseball league by registering for the league in a manner consistent with that described above. Options for the league registration process include, but are not limited to, league type (public or private); draft type (live or automatic); and other rules or league options that are selectable at the time of registration. Additionally, personalization options could include the opportunity for the player to select a team name, a team graphic/logo or other features to personalize their play.

Once registered, the player is assigned to a league, based on the type of entry they have chosen, and the league module assigns a draft date and time, once the league is filled with the pre-specified number of teams. At the appropriate date and time, a draft (live or automatic) is conducted, in order for the teams to fill their rosters. In some embodiments, the draft may include wagering elements, which could be used to influence draft pick order and/or draft dollars, as described above. Per the league rules, certain positions on the team roster are required to be filled. For example, the league rules may require the following positions be filled on the team: 9 Pitchers (P); 1 Catcher (C); 1 First Baseman (1B); 1 Second Baseman (2B); 1 Third Baseman (3B); 1 Shortstop (SS); 5 Outfielders (OF); 1 Second Baseman/Shortstop (2B/SS); 1 First/Third Baseman (1 B/3B); and 1 Utility Player.

Once the rosters of the teams have been completed, the league is effectively complete and the potential exists for players to make roster changes via trades, releasing players, claiming players off waivers, etc. per league rules. In accordance with some embodiments, the ability to make roster changes or trades may be influenced by sports dollars earned, as a result of the outcomes of wagers on gambling events, as described above.

Fantasy league play then typically commences with the start of MLB play, and each team us scored each day, as a function of the play of each player on their fantasy baseball team. A common form of a fantasy baseball league is a rotisserie league, in which teams are ranked in offensive (hitting) and pitching categories, from best to worst. In a rotisserie league, point values are assigned based on category and ranking. The following are examples of team categories tracked and scored in a rotisserie baseball league: team batting average (total hits divided by total at-bats); total home runs; total runs batted in; total stolen bases; total wins; total saves; team earned run average (9 times total earned runs divided by total innings pitched, the lower the better); and team WHIP (total number of hits and walks allowed by pitchers divided by total innings pitched, the lower the better). Categories could be added or removed depending on specific league rules.

The results of league play and fantasy league scoring are compiled and managed by the ESE 120. In accordance with various embodiments, the compilation of statistics and scoring occur on a real time basis as play progresses in any individual game in which a player's team members are involved. In accordance with other embodiments, the compilation and scoring occur on a daily or weekly basis, at the close of play for the given day or week.

In accordance with some embodiments, the GWE 112 monitors and receives inputs from the ESE 120. Functions of the GWE 112 in the fantasy baseball gambling hybrid game include conversion of ESE 120 play; and points into GWC and to trigger gambling events handled RWE 120 including providing RC based wagers. In a fantasy baseball scenario, a gambling event trigger could be based on events such as: an inning in which a member of the player's 980 team participates; at bats (AB) or inning pitched (IP) involving a member of the player's 980 team; a hit (H) for a batter, or out (O) for a pitcher which is a member of the player's team plays; and/or a game in which a member of the player's team plays. The list of triggers is not intended to be an exhaustive list, but is intended to show examples of events which might trigger a gambling event and RC gambling proposition within the RWE 102.

In some embodiments, the GWE 112 has the ability to trigger gambling events handled by RWE 904 and the associated wagers on a real-time basis, as the ESE 120 tracks real-time baseball play. In accordance with these embodiments, wagers are preloaded into the gambling hybrid game. In accordance with other embodiments, scoring takes place at the close of play, either on a game by game, day by day, or week by week basis. In order for the player's play to be recorded by the GWE 112, and converted to GWC, a wager is placed, the amount of the wager and/or the table Ln-RC may be set by the results of play as monitored by the ESE 120. Additionally, in accordance with some embodiments, the outcome of the wager could result in fantasy sports dollars for future roster changes or fantasy sports player trade consideration. Real-time play may be tracked via the internet, or a wireless device. The option exists to push results from the gambling hybrid game to a player's smartphone or other wireless device. In a multi-day or multi-week fantasy league as described above, once play has completed for a given for the specified gaming period, the opportunity may exist for players to make roster changes, which may include moving players to/from the active roster to/from the bench, releasing players, adding free agents, picking-up waivered players, trading players to/from other fantasy teams in player's league. As noted above, this element of the league may involve fantasy credits or fantasy dollars earned from the outcome of wagers made as part of the previous weeks fantasy league play Automobile Racing A third example of a fantasy sports game provided by a gambling hybrid game is automobile racing. In accordance with embodiments of gambling hybrid games providing an automobile racing fantasy sports game, players enter into a gambling hybrid game based fantasy racing league by registering for the league in a manner consistent with that described above. Options for the league registration process include, but are not limited to, league type (public or private); draft type (live or automatic); and other rules or league options that are selectable at the time of registration. Additionally, personalization options could include the opportunity for the player to select a team name, a team graphic/logo or other features to personalize their play.

Once registered, the player is assigned to a league, based on the type of entry the player has chosen, and the league module assigns a draft time and date, once the league is filled with the pre-specified number of teams. At the appropriate time and date, a draft (live or automatic) is conducted, in order to complete the rosters of the teams in the league. In a typical auto racing fantasy league, for a racing series such as NASCAR Sprint Cup (NSC), a team of five drivers is selected. This number or team composition may vary depending on the race series and/or the rules of a specific fantasy league. Once the teams have been filled, the league is effectively complete and the potential exists for players to make roster changes to their teams via trades, releasing drivers, signing new drivers, etc. per league rules. In some embodiments, the ability to make roster changes or trades may be influenced by sports dollars earned, as a result of wagering outcomes, as described above.

Fantasy league play commences with the racing series scheduled race(s), and each team is scored at the completion of each race, as a function of the race performance of each driver on the fantasy race team. The following is a scoring system for an automobile racing fantasy league in accordance with embodiments of the invention:

| NASCAR Sprint Cup Scoring: | |
| --- | --- |
| Finish | Points |
| 1st | 43 |
| 2nd | 42 |
| 3rd | 41 |
| 4th | 40 |
| 5th | 39 |
| 6th | 38 |
| 7th | 37 |
| 8th | 36 |
| 9th | 35 |
| 10th | 34 |
| 11th | 33 |
| 12th | 32 |
| 13th | 31 |
| 14th | 30 |
| 15th | 29 |
| 16th | 28 |
| 17th | 27 |
| 18th | 26 |
| 19th | 25 |
| 20th | 24 |
| 21st | 23 |
| 22nd | 22 |
| 23rd | 21 |
| 24th | 20 |
| 25th | 19 |
| 26th | 18 |
| 27th | 17 |
| 28th | 16 |
| 29th | 15 |
| 30th | 14 |
| 31st | 13 |
| 32nd | 12 |
| 33rd | 11 |
| 34th | 10 |
| 35th | 9 |
| 36th | 8 |
| 37th | 7 |
| 38th | 6 |
| 39th | 5 |
| 40th | 4 |
| 41st | 3 |
| 42nd | 2 |
| 43rd | 1 |

NASCAR Sprint Cup Bonus Points:

3 pts - Driver that wins the race
1 pt - Any driver that leads a lap in a race
1 pt - The driver that leads the most laps in a race In the case of NSC, fantasy league scoring may follow the scoring convention of the series, where each driver on the team would be scored at the end of the race, based on their finish position, plus any bonus points earned. The team score is the sum of the points for all of the drivers on the team. League rankings are based on team score either for an individual race, or as a cumulative team score, as the season progresses. The described embodiment is for a typical NSC fantasy racing league, scoring systems could vary depending on specific racing series and specific fantasy league rules.

The results of league play, and fantasy league scoring is compiled and managed by the ESE 120. In accordance with some of these embodiments, the compilation and scoring occur on a real time basis. In accordance with some other embodiments, the compilation and scoring occur at the completion of a scheduled race. The GWE 112 monitors and receives input from the ESE 120. The function of the GWE 122 in the fantasy racing league gambling hybrid game is convert ESE 120 play and points into GWC and to trigger gambling events and associated RC wagers handled by RWE 102. In a fantasy racing scenario, gambling event triggers could be based on events such as: a race lap which a member of the player's team completes and a race in which a member of the player's team drives. The preceding trigger list is not intended to be an exhaustive list, but is intended to show examples of events which might trigger gambling event and associated wagers handled by the RWE 102.

In accordance with some of these embodiments, the GWE 112 has the ability to trigger gambling events and associated wagers handled by RWE 102 on a real-time basis, as the ESE 120 tracks real-time race results. In accordance with these embodiments, gambling events and the associated wagers are preloaded into the gambling hybrid game. In accordance with some other embodiments, scoring takes place at the close of a race, on a week by week basis. In order for the player's play to be recorded by the GWE 112, and converted to GWC, a wager is placed, the amount of the wager and/or the table Ln-RC may be set by the results of play as monitored by the ESE 120. Additionally, in accordance with some of these embodiments, the outcome of the wager results in fantasy sports dollars for future roster changes or fantasy sports player trade consideration. Real-time play may be tracked via the internet, or a wireless device. The option could exist to push results from the gambling hybrid game to a player's smartphone or other wireless device.

In accordance with embodiments providing a multi-race or multi-week fantasy league as described above, once play has completed for a given gaming period, the opportunity exists for players to make roster changes, which may include moving players to/from the active roster to/from the bench, releasing players, adding free agents, picking-up waivered players, trading players to/from other fantasy teams in player's league. As noted above, this element of the league may involve fantasy credits or fantasy dollars earned from the outcome of wagers made as part of the previous weeks fantasy league play.

Basketball

A fourth example of a fantasy sports game provided by a gambling hybrid game is basketball. In accordance with embodiments of gambling hybrid games providing a basketball fantasy sports game, players enter into a gambling hybrid game based fantasy basketball league by registering for the league in a manner consistent with that described above. Options for the league registration process include, but are not limited to, league type (public or private); draft type (live or automatic); and other rules or league options that are selectable at the time of registration. Additionally, personalization options could include the opportunity for the player to select a team name, a team graphic/logo or other features to personalize their play. Once registered, the player is assigned to a league, based on the type of entry they have chosen, and the league module assigns a draft date and time, once the league is filled with the pre-specified number of teams.

At the appropriate date and time, a draft (live or automatic) is conducted to complete the rosters of the teams in the league. In accordance with some of these embodiments, the draft may include wagering elements, which could be used to influence draft pick order and/or draft dollars, as described above. Per the league rules, certain positions on the team roster may be required to be filled, such as the following requirements: 1 Point Guard (PG); 1 Shooting Guard (SG); 1 Guard—Point or Shooting Guard; 1 Power Forward (PF); 1 Small Forward (SF); 1 Forward—Power or Small; 2 Centers (C); and 5 Utility Players. Once the teams have been filled, the league is effectively complete and the potential exists for players to make roster changes via trades, releasing players, claiming players off waivers, etc. per league rules. In accordance with some of these embodiments, the ability to make roster changes or trades may be influenced by sports dollars earned, as a result of wagering outcomes, as described above.

Fantasy league play commences with NBA or other sports league play, and each team is scored each day, as a function of the play of each player on the particular fantasy basketball team. A common form of a fantasy basketball league scoring is a rotisserie league, in which teams are ranked in various offensive and defensive categories, from best to worst. In a rotisserie league, point values are assigned based on category and ranking. The following statistical categories maybe tracked for a rotisserie basketball league: Points, Rebounds, Assists, Steals, Blocks, and Three-pointers Made, Field Goal Percentage, and Free Throw Percentage. The list of statistical categories is an example of direct statistics categories that could be used in rotisserie or head to head league play. Other direct statistics or derived statistics (e.g. Shooting Percentage=Shots Made/Shots Attempted×100%) categories could be added or removed depending on specific league rules.

The results of league play and fantasy league scoring are compiled and managed by the ESE 120. In accordance with various embodiments, the scoring occurs on a real time basis, as play progresses in any individual game in which a players team members are involved. In accordance with other embodiments, the scoring occurs on a daily or weekly basis, at the close of play for the given day or week. The GWE 112 monitors and receives input from the ESE 120. Functions of the GWE 112 in the fantasy basketball gambling hybrid game include conversion of ESE 120 play and points into GWC; and to trigger gambling events and associated RC wagers handled by the RWE 102. In accordance with embodiments of gambling hybrid games providing fantasy basketball games, triggers of gambling events include: a quarter in which a member of the player's team participates, and a game in which a member of the player's team plays. The list of triggers is not intended to be an exhaustive list, but is intended to show examples of events which might trigger a gambling event and associated within the RWE 104. In accordance with some of these embodiments, the GWE 112 has the ability to trigger gambling events and associated wagers handled by RWE 104 on a real-time basis, as the ESE 120 tracks real-time basketball play. In accordance with these embodiments, the gambling events and associated wagers are preloaded into the gambling hybrid game. In accordance with other embodiments, scoring takes place at the close of play, either on a game by game, day by day, or week by week basis. In order for the player's play to be recorded by the GWE 112, and converted to GWC, a wager is placed, the amount of the wager and/or the table Ln-RC are set by the results of play as monitored by the ESE 120. Additionally, in accordance with some of these embodiments, the outcome of the wager results in fantasy sports dollars for future roster changes or fantasy sports player trade consideration.

Real-time play may be tracked via the internet, or a wireless device. The option exists to push results from the gambling hybrid game to a player's smartphone or other wireless device. In accordance with embodiments that provide scoring on a multi-day or multi-week basis as described above, once play has completed for a given for specified period, the opportunity may exist for players to make roster changes. The changes include moving players to/from the active roster to/from the bench, releasing players, adding free agents, picking-up waivered players, and trading players to/from other fantasy teams in the player's league. As noted above, this element of the league may involve fantasy credits or fantasy dollars earned from the outcome of wagers made as part of the previous weeks of fantasy league play. Hockey A fifth example of a fantasy sports game provided by a gambling hybrid game is hockey. In accordance with embodiments of gambling hybrid games providing a hockey fantasy sports game, players enter into a gambling hybrid game based fantasy hockey league by registering for the league in a manner consistent with that described above. Options for the league registration process include, but are not limited to, league type (public or private); draft type (live or automatic); and other rules or league options that are selectable at the time of registration. Additionally, personalization options could include the opportunity for the player to select a team name, a team graphic/logo or other features to personalize their play. Once registered, the player is assigned to a league, based on the type of entry they have chosen, and the league module assigns a draft date and time, once the league is filled with the pre-specified number of teams. Once registered, the player may be assigned to a league, based on the type of entry they have chosen, and the league module could assign a draft date and time, once the league is filled with the pre-specified number of teams. At the appropriate date and time, a draft (live or automatic) could be conducted, in order for the teams to fill their rosters.

At the appropriate date and time, a draft (live or automatic) is conducted to complete the rosters of the teams in the league. In accordance with some of these embodiments, the draft may include wagering elements, which could be used to influence draft pick order and/or draft dollars, as described above. Per the league rules, certain positions on the team roster may be required to be filled, such as the following requirements: 9 Forwards—Right, Center and Left Wingers (F); 5 Defensemen (D); 1 Utility—Forward or Defenseman (U); 2 and Goalies (G). Once the teams have been filled, the league is effectively complete and the potential exists for players to make roster changes via trades, releasing players, claiming players off waivers, etc. per league rules. In accordance with some of these embodiments, the ability to make roster changes or trades may be influenced by sports dollars earned, as a result of wagering outcomes, as described above.

Fantasy league play commences with NHL or another hockey league play, and each team is scored each day, as a function of the play of each player on each particular fantasy hockey team. A common form of a fantasy hockey league is a rotisserie league, in which teams are ranked in offensive and defensive statistical categories, from best to worst. In a rotisserie league, point values are assigned based on each statistical category and ranking. The following is a list of statistical categories for a rotisserie hockey league in accordance with some embodiments of the invention: For Skaters (F, D & U): Goals (G), Assists (A), Plus/minus (+/−), Penalties (PIM), Average time on ice (ATOI), Power-play points (PPP), and Shots on goal (SOG) and for Goalies (G): Wins (W), Goals against average (GAA), and Save percentage (S %). Other direct statistics or derived statistics categories could be added or removed depending on specific league rules.

The results of league play and fantasy league scoring are compiled and managed by the ESE 120. In accordance with various embodiments, the scoring occurs on a real time basis, as play progresses in any individual game in which a players team members are involved. In accordance with other embodiments, the scoring occurs on a daily or weekly basis, at the close of play for the given day or week. The GWE 112 monitors and receives input from the ESE 120. Functions of the GWE 112 in the fantasy hockey gambling hybrid game include conversion of ESE 120 play and points into GWC; and to trigger gambling events and associated RC wagers handled by the RWE 102. In accordance with embodiments of gambling hybrid games providing fantasy hockey games, triggers of gambling events include: a period in which a member of the player's team participates, a shot on goal by a skater, or a save by a goalie who is a member of the player's team; and a game in which a member of the player's team plays. The list of triggers is not intended to be an exhaustive list, but is intended to show examples of events which might trigger a gambling event and associated within the RWE 104. In accordance with some of these embodiments, the GWE 112 has the ability to trigger gambling events and associated wagers handled by RWE 104 on a real-time basis, as the ESE 120 tracks real-time hockey play. In accordance with these embodiments, the gambling events and associated wagers are preloaded into the gambling hybrid game. In accordance with other embodiments, scoring takes place at the close of play, either on a game by game, day by day, or week by week basis. In order for the player's play to be recorded by the GWE 112, and converted to GWC, a wager is placed, the amount of the wager and/or the table Ln-RC are set by the results of play as monitored by the ESE 120. Additionally, in accordance with some of these embodiments, the outcome of the wager results in fantasy sports dollars for future roster changes or fantasy sports player trade consideration.

Real-time play may be tracked via the internet, or a wireless device. The option exists to push results from the gambling hybrid game to a player's smartphone or other wireless device. In accordance with embodiments that provide scoring on a multi-day or multi-week basis as described above, once play has completed for a given for specified period, the opportunity may exist for players to make roster changes. The changes include moving players to/from the active roster to/from the bench, releasing players, adding free agents, picking-up waivered players, and trading players to/from other fantasy teams in player's league. As noted above, this element of the league may involve fantasy credits or fantasy dollars earned from the outcome of wagers made as part of the previous weeks of fantasy league play.

Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure. It is therefore to be understood that gaming system may be practiced otherwise than as specifically described. Thus, the foregoing description of the gaming system should be considered in all respects as illustrative and not restrictive, the scope of the claims to be determined as supported by this disclosure and the claims' equivalents, rather than the foregoing description.

What is claimed is:

1. A network distributed computing system, comprising:
an entertainment engine including a user input device and a display output device and connected to a controller by a network, wherein the entertainment engine is configured to execute an entertainment game and present an entertainment game to a player wherein the entertainment game is a fantasy sports game, and wherein the entertainment engine is further configured to:
provide a draft for the fantasy sports game based on a first gambling event;
maintain a team roster of participants in a sport for the player;
receive data pertaining to sporting events in the sport; and
compile a score for the team based on the roster of participants on the team and the data pertaining to the sporting events;
receive from the controller, an amount of game world currency and an amount of real world currency;
generate a graphical display of the entertainment game, the received data, the amount of the game world currency, and the amount of real world currency using the display output device;
a server connected to the controller by a communication link, wherein the server is constructed to:
determine a first gambling result using a regulated random number generator;
distribute the first gambling result to the controller;
determine a second gambling result of a second gambling event;
resolve a wager on a proposition about the result of the second gambling event; and
distribute the second gambling result to the controller; and
the controller connected to the entertainment engine by the network and connected to the server by the communication link, wherein the controller is constructed to:
request a resolution to the first gambling event by the server;
receive the result of the first gambling event from the server;
determine the order of selections in the draft based on the first gambling result;
determine an amount of real world currency to provide to the player based on the result of the first gambling event;
determine when the second gambling event occurs during play of the entertainment game and request a resolution to the second gambling event by the server;
receive a status update about the sporting events of fantasy sports game from the entertainment engine;
determine the second gambling event is to occur based upon the status update from the entertainment engine;
request the second gambling event be resolved by the server ;
receive the result of the second gambling event from the server;
determine the amount of game world currency to provide to the player based on the result of the second gambling event;
determine the amount of real world currency to provide to the player based on the result of the second gambling event; and
distribute the amount of game world currency and the amount of real world currency to the entertainment engine.

2. The network distributed computing system of claim 1 wherein the controller is constructed to:
provide a draft for the fantasy sports game with multiple rounds based on a series of gambling events;
request a resolution of a series of gambling events by the server;
receive the series of results of the gambling event from the server using a regulated random number generator; and
determine an order of selections based on the results of the series of gambling events.

3. The network distributed computing system of claim 1, wherein the entertainment engine is constructed to allow a player to make an adjustment to a roster of the team of the player for a certain amount of game world currency.

4. The network distributed computing system of claim 1, wherein the controller and the server are constructed from a same processing apparatus.

5. The network distributed computing system of claim 1, wherein the controller and the server are constructed from different processing apparatuses, and wherein the communication link utilizes a network.

* * * * *